US009491054B2

(12) United States Patent
Zhang et al.

(10) Patent No.: US 9,491,054 B2
(45) Date of Patent: Nov. 8, 2016

(54) NETWORK-STATE MANAGEMENT SERVICE

(71) Applicant: Microsoft Technology Licensing, LLC, Redmond, WA (US)

(72) Inventors: Ming Zhang, Redmond, WA (US); Ratul Mahajan, Seattle, WA (US); Peng Sun, Princeton, NJ (US); Lihua Yuan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 160 days.

(21) Appl. No.: 14/298,762

(22) Filed: Jun. 6, 2014

(65) Prior Publication Data

US 2015/0358209 A1 Dec. 10, 2015

(51) Int. Cl.
*H04L 12/24* (2006.01)
*H04L 12/911* (2013.01)
*H04L 12/26* (2006.01)

(52) U.S. Cl.
CPC ......... *H04L 41/0893* (2013.01); *H04L 41/082* (2013.01); *H04L 41/0869* (2013.01); *H04L 41/0873* (2013.01); *H04L 41/14* (2013.01); *H04L 43/08* (2013.01); *H04L 47/70* (2013.01); *H04L 41/0672* (2013.01); *H04L 41/0695* (2013.01); *H04L 41/0813* (2013.01); *H04L 41/0816* (2013.01)

(58) Field of Classification Search
None
See application file for complete search history.

(56) References Cited

U.S. PATENT DOCUMENTS

| 5,537,580 A * | 7/1996 | Giomi ................. G06F 17/5045 716/103 |
| 5,850,505 A | 12/1998 | Grover et al. |
| 6,606,580 B1 | 8/2003 | Zedda et al. |
| 6,724,722 B1 | 4/2004 | Wang et al. |

(Continued)

FOREIGN PATENT DOCUMENTS

| EP | 1946502 A1 | 7/2008 |
| WO | WO9834350 A2 | 8/1998 |
| WO | WO2013071965 A1 | 5/2013 |

OTHER PUBLICATIONS

"CPLEX Optimizer", retrieved on Mar. 10, 2014 at <<www-01.ibm.com/software/commerce/optimization/cplex-optimizer/>>, IBM, 2014.

(Continued)

*Primary Examiner* — Bunjob Jaroenchonwanit
(74) *Attorney, Agent, or Firm* — Alin Corie; Sandy Swain; Micky Minhas

(57) ABSTRACT

The techniques and/or systems described herein implement a network management service configured to read and write a state of a network for various applications (e.g., network management applications) so that the applications can operate independently. The network management service is configured to read an observed network state and provide the observed network state to the applications. Subsequently, the network management service receives proposed network states from the applications and uses a state dependency graph to determine whether state conflicts exist between the proposed network states. The network management service also determined whether defined policies are violated by the proposed network states. Finally, the network management service is configured to generate a target network state by merging non-conflicting proposed network states that comply with defined policies and to update (e.g., write) the network state based on the generated target network state.

20 Claims, 7 Drawing Sheets

(56) References Cited

U.S. PATENT DOCUMENTS

| | | | |
|---|---|---|---|
| 7,221,945 B2* | 5/2007 | Milford | H04L 1/16 370/235 |
| 7,251,582 B2 | 7/2007 | Singh et al. | |
| 7,469,392 B2* | 12/2008 | Mang | G06F 17/504 716/106 |
| 7,539,133 B2 | 5/2009 | van Haalen et al. | |
| 7,552,205 B2* | 6/2009 | Lamb | G06Q 20/02 709/202 |
| 7,610,386 B1* | 10/2009 | Martinez | H04L 67/14 709/224 |
| 7,680,055 B1 | 3/2010 | Ramakrishnan et al. | |
| 7,730,364 B2 | 6/2010 | Chang et al. | |
| 7,746,784 B2 | 6/2010 | de Heer | |
| 7,796,500 B1* | 9/2010 | Elliott | H04L 41/0681 370/216 |
| 7,797,648 B1* | 9/2010 | Huang | G06F 17/504 716/111 |
| 7,831,627 B2* | 11/2010 | Chickering | G06F 17/30536 707/797 |
| 7,839,789 B2 | 11/2010 | Kakadia et al. | |
| 7,894,478 B2 | 2/2011 | Ullmann et al. | |
| 7,990,885 B2 | 8/2011 | Rajan | |
| 7,996,719 B2 | 8/2011 | Bernabeu-Auban et al. | |
| 8,086,701 B2 | 12/2011 | Goel et al. | |
| 8,135,990 B2 | 3/2012 | Vankov et al. | |
| 8,175,846 B2 | 5/2012 | Khalak et al. | |
| 8,228,804 B2 | 7/2012 | Ninan et al. | |
| 8,369,222 B2 | 2/2013 | Kakadia et al. | |
| 8,463,916 B2 | 6/2013 | Rabbie et al. | |
| 8,494,539 B1 | 7/2013 | Surazski et al. | |
| 8,612,583 B2 | 12/2013 | Hui et al. | |
| 8,613,002 B2* | 12/2013 | Narayanan | G06F 9/542 719/328 |
| 8,644,161 B2 | 2/2014 | Woundy et al. | |
| 8,700,958 B2 | 4/2014 | Vankov et al. | |
| 8,819,220 B2 | 8/2014 | Nagura et al. | |
| 8,826,032 B1* | 9/2014 | Yahalom | H04L 43/0817 713/187 |
| 8,887,132 B1* | 11/2014 | Hunter | G06F 9/44505 717/111 |
| 9,110,524 B1* | 8/2015 | Jiang | G06F 1/04 |
| 9,141,625 B1* | 9/2015 | Thornewell | G06F 17/30079 |
| 2002/0130872 A1* | 9/2002 | Novikova | G06T 13/00 345/473 |
| 2003/0014644 A1* | 1/2003 | Burns | H04L 63/0263 713/182 |
| 2003/0055668 A1 | 3/2003 | Saran et al. | |
| 2003/0106062 A1* | 6/2003 | Shteyn | H04L 12/2803 725/78 |
| 2003/0220906 A1* | 11/2003 | Chickering | G06N 7/005 |
| 2004/0218535 A1* | 11/2004 | Liong | H04L 41/0893 370/238 |
| 2005/0076339 A1 | 4/2005 | Merril et al. | |
| 2005/0188242 A1 | 8/2005 | Rabbat et al. | |
| 2006/0103869 A1* | 5/2006 | Kato | G06F 3/1204 358/1.13 |
| 2007/0073737 A1 | 3/2007 | Patterson | |
| 2007/0282914 A1* | 12/2007 | Sivapragasam | G06F 17/30578 |
| 2008/0215713 A1* | 9/2008 | Cannon | H04L 12/24 709/221 |
| 2008/0262992 A1* | 10/2008 | Meijer | G06F 9/4428 706/52 |
| 2008/0271022 A1* | 10/2008 | Strassner | H04L 41/0873 718/100 |
| 2008/0300851 A1 | 12/2008 | Chakrabarti et al. | |
| 2009/0161878 A1* | 6/2009 | Nam | H04L 47/283 380/283 |
| 2009/0172689 A1 | 7/2009 | Bobak et al. | |
| 2009/0240645 A1* | 9/2009 | Cowham | G06N 5/025 706/48 |
| 2009/0327199 A1* | 12/2009 | Weber | G06Q 10/06 706/48 |
| 2010/0250744 A1* | 9/2010 | Hadad | G06F 9/4856 709/226 |
| 2011/0116389 A1* | 5/2011 | Tao | H04L 45/18 370/252 |
| 2011/0154132 A1* | 6/2011 | Aybay | H04L 43/026 714/49 |
| 2011/0185359 A1* | 7/2011 | Chakrabarti | G06F 9/466 718/101 |
| 2011/0191109 A1* | 8/2011 | Harma | G10L 25/48 704/275 |
| 2011/0231573 A1 | 9/2011 | Vasseur et al. | |
| 2012/0101980 A1* | 4/2012 | Taleghani | G06F 17/2288 707/608 |
| 2012/0163178 A1 | 6/2012 | Gordon et al. | |
| 2012/0166660 A1* | 6/2012 | Zhang | H04L 12/2809 709/228 |
| 2012/0167168 A1* | 6/2012 | Orr | H04L 63/0209 726/1 |
| 2012/0209582 A1* | 8/2012 | Purushothaman | H04W 24/02 703/13 |
| 2012/0216201 A1* | 8/2012 | Aghajanyan | H04L 67/1097 718/100 |
| 2012/0221678 A1 | 8/2012 | Tanaka | |
| 2012/0323702 A1* | 12/2012 | Puentes | G06Q 30/02 705/14.71 |
| 2012/0324472 A1 | 12/2012 | Rossbach et al. | |
| 2013/0031253 A1* | 1/2013 | Hui | H04L 43/0811 709/225 |
| 2013/0060929 A1* | 3/2013 | Koponen | H04L 12/4633 709/224 |
| 2013/0114466 A1 | 5/2013 | Koponen et al. | |
| 2013/0121331 A1 | 5/2013 | Vasseur et al. | |
| 2013/0250805 A1 | 9/2013 | Hansmann | |
| 2013/0294250 A1* | 11/2013 | Berelejis | H04L 47/193 370/236 |
| 2013/0329632 A1 | 12/2013 | Buyukkoc et al. | |
| 2014/0020043 A1* | 1/2014 | Anand | G06F 9/544 726/1 |
| 2014/0126395 A1* | 5/2014 | Matthews | H04L 49/15 370/252 |
| 2014/0244218 A1 | 8/2014 | Greenberg et al. | |
| 2015/0010012 A1* | 1/2015 | Koponen | H04L 41/0873 370/411 |
| 2015/0032894 A1* | 1/2015 | Rosensweig | H04L 41/5019 709/226 |
| 2015/0106781 A1* | 4/2015 | Adler | G06F 9/4436 717/104 |
| 2015/0178366 A1 | 6/2015 | Farahbod et al. | |
| 2015/0205596 A1* | 7/2015 | Hiltegen | G06F 8/60 717/172 |
| 2015/0220216 A1* | 8/2015 | Wigdor | G06F 3/0481 715/765 |
| 2015/0249587 A1 | 9/2015 | Kozat et al. | |
| 2015/0275806 A1 | 10/2015 | Genslak et al. | |
| 2015/0301878 A1* | 10/2015 | Chen | G06F 11/3676 714/48 |
| 2015/0309969 A1* | 10/2015 | Kahn | G06F 17/241 715/205 |
| 2015/0362559 A1* | 12/2015 | Hametner | G01R 31/3624 702/63 |
| 2016/0042045 A1* | 2/2016 | Adoc, Jr. | G06Q 30/0641 707/634 |
| 2016/0055226 A1* | 2/2016 | Bruening | G06F 17/30581 707/611 |

OTHER PUBLICATIONS

Jin et al., "Dynamic Scheduling of Network Updates", in the Proceedings of the 2014 Conference on SIGCOMM, Aug. 2014, pp. 539-550.

Lim et al., "Congestion-Free Routing Reconfiguration: Formulation and Examples", in the Proceedings of the 2014 48th Annual Conference on Information Sciences and Systems, Mar. 2014, pp. 1-6.

PCT Search Report & Written Opinion for Application No. PCT/US2015/033860, mailed on Oct. 21, 2015, 13 pages.

PCT Search Report & Written Opinion for Application No. PCT/US2015/034089, mailed on Sep. 10, 2015, 11 pages.

PCT Search Report & Written Opinion for Application No. PCT/US2015/034088, mailed on Sep. 8, 2015, 12 pages.

(56) References Cited

OTHER PUBLICATIONS

Radetzki, "Fault-Tolerant Differential Q Routing in Arbitrary NoC Topologies", in the Proceedings of 2011 IFIP 9th International Conference on Embedded and Ubiquitous Computing, Oct. 24, 2011, pp. 33-40.

Takita et al., "Network Reconfiguration Targeting Minimum Connection Disruption", in the Proceedings of the 2014 International Conference on Optical Network Design and Modeling, May 2014, pp. 198-203.

Turner et al., "California Fault Lines: Understanding the Causes and Impact of Network Failures", In the Proceedings of the ACM SIGCOMM 2010 Conference, Aug. 30, 2010, 12 pages.

Vanbever, et al., "Lossless Migrations of Link-State IGPs", Journal of IEEE/ACM Transactions on Networking, vol. 20, Issue 6, Dec. 2012, 14 pages.

Wang et al., "COPE: Traffic Engineering in Dynamic Networks", In the Proceedings of the 2006 Conference on Applications, Technologies, Architectures, and Protocols for Computer Communciations, Sep. 11, 2006, 12 pages.

Xu et al., "Link-State Routing with Hop-by-Hop Forwarding can Achieve Optimal Traffic Engineering", IEE/ACM Transactions on Networking (TON) Journal, vol. 19, Iss. 6, Dec. 2001, 14 pages.

Zhang-Shen, et al., "Designing a Fault-Tolerant Network Using Valiant Load-Balancing", in the Proceedings of the 27th IEEE Conference on Computer Communications, Apr. 13, 2008, 5 pages.

Applegate et al., "Coping with Network Failures: Routing Strategies for Optimal Demand Oblivious Restoration", In the Proceedings of the Joint International Conference on Measurement and Modeling of Computer Systems, Jun. 10, 2004, pp. 270-281.

Applegate et al., "Making Intra-domain Routing Robust to Changing and Uncertain Traffic Demands: Understanding Fundamental Tradeoffs", In the Proceedings of the 2003 Conference on Applications, Technologies, Architectures, and Protocols for Computer Communications, Aug. 25, 2008, pp. 313-324.

"Arista 7500 Series Technical Specifications", retrieved on Mar. 10, 2014 at <<http://www.aristanetworks.com/en/products/7500series/specifications>>, Arista Networks, Inc., 2014.

Atlas et al., "Basic Specification for IP Fast-Reroute: Loop-Free Alternates", The Internet Engineering Task Force, 2008 Request for Comments, Sep. 2008, 31 pages.

Ballani et al., "Towards Predictable Datacenter Networks", In the Proceedings of the ACM SIGCOMM 2011 Conference, Aug. 15, 2011, 12 pages.

Batcher, "Sorting Networks and their Applications", In the Proceedings of the AFIPS 1968 Spring Joint Computer Conference, Apr. 30, 1968, 8 pages.

Benson et al., "Micro TE: Fine Grained Traffic Engineering for Data Centers", In the Proceedings of the 7th Conference on Emerging Networking Experiments and Technologies, Article 8, Dec. 6, 2011, pp. 1-12.

Casado et al., "Fabric: A Retrospective on Evolving SDN", In the Proceedings of the 1st worksop on Hot Topics in Software Defined Networks, Aug. 13, 2012, pp. 85-90.

Casado et al., "Rethinking Enterprise Network Control", IEEE/ACM Transactions on Networking, vol. 17, Issue 4, Aug. 1, 2009, pp. 1270-1283.

Cormen et al., "Introduction to Algorithms", Third Edition, MIT Press, Ch. 7, "Graph Algorithms", Feb. 2009, pp. 586-766.

Curtis et al. "DevoFlow: Scaling Flow Management for High-Performance Networks", In the Proceedings of the ACM SIGCOMM 2011 Conference, Aug. 15, 2011, pp. 254-265.

Dugan et al., "Iperf", retrieved on Mar. 10, 2014 at <<sourceforge.net/projects/iperf/>>, Dice Holdings, Inc., 2013.

Elwalid et al., "MATE: MPLS Adaptive Traffic Engineering", In the Proceedings of Twentieth Annual Joint Conference of the IEEE Computer and Communciations Societies, Apr. 22, 2001, 10 pages.

Even et al., "On the Complexity of Time Table and Multi-commodity Flow Problems", In the Proceedings of the 16th Annual Suymposium on Foundations of Computer Science, Oct. 13, 1975, pp. 184-193.

Feamster et al., "Detecting BGP Configuration Faults with Static Analysis", Proceedings of the 2nd Conference on Symposium on Networked Systems Design &Implementation, vol. 2, May 2005, 14 pages.

Francois et al., "Avoiding Disruptions During Maintenance Operations on BGP Sessions", IEE Transactions on Network and Service Management, vol. 4, Issue 3, Dec. 2007, pp. 1-11.

Francois et al., "Avoiding Transient Loops During the Convergence of Link-State Routing Protocols", Journal of IEEE/ACM Transactions on Networking, vol. 15, Issue 6, Dec. 2007, 13 pages.

Francois, et al., "Disruption free topology reconfiguration in OSPF networks", 26th IEEE International Conference on Computer Communications, May 2007, 9 pages.

Ghorbani, et al., "Walk the Line: Consistent Network Updates with Bandwidth Guarantees", Proceedings of the 1st Workshop on Hot Topics in Software Defined Networks, Aug. 2012, 6 pages.

Gill et al., "Understanding Network Failures in Data Centers: Measurement, Analysis, and Implications", In the Proceedings of the ACM SIGCOMM 2011 Conference, Aug. 15, 2011, pp. 350-361.

John, et al., "Consensus Routing: The Internet as a Distributed System" Proceedings of the 5th USENIX Symposium on Networked Systems Design and Implementation, Apr. 2008, 14 pages.

Kandula et al., "Flyways to De-Congest Data Center Networks", In the Proceedings of the 8th ACM Workshop on Hot Topics in Networks, Oct. 23, 2009, 6 pages.

Kar et al., "Routing Restorable Bandwidth Guaranteed Connectons Using Maximum 2-Route Flows", IEEE/ACM Transaction on Networking (TON), vol. 11, Iss. 5, Oct. 2003, 11 pages.

Katta et al., "Incremental Consistent Updates", In the Proceedings of the 2nd ACM SIGCOMM Workshop on Hot Topics in Software Defined Networking, Aug. 16, 2013, pp. 49-54.

Kazemian et al., "Real Time Network Policy Checking using Header Space Analysis", Proceedings of 10th USENIX Conference on Networked Systems Design and Implementation, Apr. 2013, 13 pages.

Khurshid et al., "VeriFlow: Verifying Network-Wide Invariants in Real Time", Proceedings of 1st Workshop on Hot Topics in Software Defined Networks, Aug. 2012, 6 pages.

Kodialam et al., "Dynamic Routing of Restorable Bandwidth-Guaranteed Tunnels Using Aggregated Network Resources Usage Information", IEEE/ACM Transactions on Networking (TON), vol. 11, Iss. 3, Jun. 2003, pp. 399-410.

Kushman, et al., "R-BGP: Staying Connected In a Connected World", Proceedings of the 4th USENIX Conference on Networked Systems Design & Implementation, Apr. 2007, 14 pages.

Mahajan et al., "On Consistent Updates in Software Defined Networks", in the Proceedings of teh 12th ACM Worksop on Hot Topics in Networks, Article 20, Nov. 21, 2013, 7 pages.

Markopoulou et al., "Characterization of Failures in an Operational IP Backbone Network", IEEE/ACM Transactions on Networking (TON), vol. 16, Iss. 4, Aug. 2008, pp. 749-762.

McGeer, Rick, "A Correct, Zero-Overhead Protocol for Network Updates" In the Proceedings of the 2nd ACM SIGCOMM 2013 Workshop on Hot Topics in Software Defined Networking, Aug. 16, 2013, pp. 161-162.

McGeer, "A Safe, Efficient Update Protocol for OpenFlow Networks", Proceedings of the 1st Workshop on Hot Topics in Software Defined Networks, Aug. 2012, 6 pages.

"Microsoft Solver Foundation", retrieved on Mar. 10, 2014 at <<http://msdn.microsoft.com/en-us/devlabs/hh145003.aspx>>, Microsoft Corp., 2014.

Mizrahi et al., "Time-based Updates in Software Defined Networks", In the Proceedings of the 2nd ACM SIGCOMM 2013 Workshop on Hot Topics in Software Defined Networking, Aug. 16, 2013, pp. 163-164.

"Network Virtualization with VMware NSX Virtualized Network", retrieved on Mar. 10, 2014 at <<http://www.vmware.com/products/nsx/>>, VMware, Inc. 2014.

Newman, Mark, "Networks: An Introduction", Oxford University Press, May 20, 2010, Ch. 7 "Measures and Metrics", pp. 167-240.

(56) References Cited

OTHER PUBLICATIONS

Noyes et al., "Toward Synthesis of Network Updates", Proceedings of the 2nd Workshop on Synthesis, Jul. 2013, 16 pages.
"OpenFlow Switch Specification", Stanford University, Feb. 28, 2011, 56 pages.
Peresini et al., "ESPRES: Easy Scheduling and Prioritization for SDN", In the Proceedings of Open Networking Summit 2014 Research Track, Mar. 2, 2014, 2 pages.
Raghavan et al., "Cloud Control with Distributed Rate Limiting", In the Proceedings of the 2007 Conference on Applications, Technologies, Architectures, and Protocols for Computer Communications, Aug. 27, 2007, 12 pages.
Raghavan et al., "Software-Defined Internet Architecture: Decoupling Architecture from Infrastructure", In the Proceedings of teh 11yth ACM Workshop on Hot Topics in Networks, Oct. 29, 2012, pp. 43-48.
Raza, et al., "Graceful Network State Migrations", Journal of IEEE/ACM Transactions on Networking, vol. 19, Issue 4, Aug. 2011, 14 pages.
Reitblatt et al., "Abstractions for Network Update", In the Proceedings of the ACM SIGCOMM 2012 Conference on Applications, Technologies, Architectures, and Protocols for Computer Communication, Aug. 13, 2012, pp. 323-334.
Reitblatt et al., "Consistent Updates for Software-Defined Networks: Change You can Believe In!", In the Proceedings of the 10th ACN Workshop on Hot Topics in Networks, Nov. 14, 2011, Article 7, 2 pages.
Rotsos et al., "OFLOPS: An Open Framework for OpenFlow Switch Evaluation", In the Proceedings of teh 13th International Conference on Passive and Active Measurement, Mar. 12, 2012, 11 pages.
Sengupta et al., "Efficient and Robust Routing of Highly Variable Traffic", In the Proceedings of the Third Workshop on Hot Topics in Networks, Nov. 2004, 6 pages.
Sharafat et al., "MPLS-TE and MPLS VPNS with Openflow", In the Proceedings of teh ACM SIGCOMM 2011 Conference, Aug. 15, 2011, pp. 452-453.
Suchara et al., "Network Architecture for Joint Failure Recovery and Traffic Engineering", In the Proceedings of the ACM SIGMETRICS Joint International Conference on Measurement and Modeling of Computer Systems, Jun. 7, 2011, 12 pages.
Susitaival et al., "Adaptive load balancing with OSPF", Netowrking Laboratory, Helsink University of Technology, Finland, Jan. 2004, 18 pages.
Tarjan, "Depth-First Search and Linear Graph Algorithms", In SIAM Journal on Computing, vol. 1, No. 2, Jun. 1972, pp. 146-160.
Agrawal et al., "Policy-based Management of Networked Computing Systems," IEEE Communications Magazine, vol. 43, Iss. 10, Oct. 2005, 9 pages.
Al-Fares et al., "Hedera: Dynamic Flow Scheduling for Data Center Networks", In the Proceedings of the 7th USENIX Conference on Networked Systems Design and Implementation, Apr. 28, 2010, 15 pages.
Bailis et al., "Eventual Consistency Today: Limtiations, Extensions, and Beyond", Queue, vol. 11, Issue 3, Mar. 2013, 13 pages.
Ballani et al., "CONMan: A Step Towards Network Manageability", In the Proceedings of the 2007 Conference on Applications, Technologies, Architectures, and Protocols for Computer Communications, Aug. 27, 2007, 15 pages.
Bivens et al., "Scalability and Performance of an Agent-based Network Management Middleware", In the International Journal of Network Management, vol. 14, Iss. 2, Mar. 1, 2004, 58 pages.
Caesar et al., "Design and Implementation of a Routing Control Platform", In the Proceedings of the 2nd Conference on Symposium on Networked Systems Design & Implementation vol. 2, May 2, 2005, 14 pages.
Casado et al., "Ethane: Taking Control of the Enterprise", In the Proceedings of the 2007 Confernece on Applications, Technologies, Architectures, and Protocols for Compuer Communications, Aug. 27, 2007, pp. 1-12.
Casado et al., "SANE: A Protection Architecture for Enterprise Networks", In the Proceedings of the 15th conference on USENIX Security Symposium, vol. 15, Art. 10, Jul. 31, 2006, 15 pages.
Dobrescu et at, "Toward a Verifiable Software Dataplan", In the Proceedings of the 12th ACM Workshop on Hot Topics in Networks, Art. 18, Nov. 21, 2013, 7 pages.
Feamster et al., "The Road to SDN: An Intellectual History of Programmable Networks", In the Proceedings of ACM Dueue, vol. 11, No. 12, Dec. 30, 2013, 13 pages.
Ferguson et al., "Participatory Networking: An API for Application Control of SDNs", In the Proceedings of the ACM SIGCOMM 2013 Conference on SIGCOMM, Aug. 12, 2013, 12 pages.
"Google Official Blog", retrieved on Mar. 11, 2014 at <<http://googleblog.blogspot.in/2013/01/todays-outagefor-several-google.html>>, Google, Inc., 2014.
Greenberg et al., "A Clean Slate 4D Approach to Network Control and Management" In the Proceedings of the ACM SIGCOMM Computer Communciation Review, vol. 35. Iss. 5, Oct. 6, 2005, 12 pages.
Gude et al., "NOX: Towards an Operating System for Networks", In the Proceedings of the ACM SIGCOMM Computer Communciation Review, vol. 38, Iss. 3, Jul. 1, 2008, 6 pages.
Heller et al., "ElasticTree: Saving Energy in Data Center Networks" In the Proceedings of the 7th USENIX Conferece on Networked Systems Design and Implementation, Apr. 28, 2010, 16 pages.
Hong et al., "Achieving High Utilization with Software-driven WAN", In the Proceedings of the ACM SIGCOMM 2013 Conference on SIGCOMM, Aug. 12, 2013, 12 pages.
Hunt et al., "ZooKeeper: Wait-Free Coordination for Internet-Scale Systems", In the Proceedings of the USENIX Conference on USENIX Annual Techinical Conference, Jun. 23, 2010, 14 pages.
Jain et al, "B4: Experience with a Globally-deployed Software Defined WAN", In the Proceedings of the ACM SIGCOMM 2013 Conference, Aug. 12, 2013, pp. 3-14.
Kandula et al., "Walking the Tightrope: Responsive yet Stable Traffic Engineering", In the Proceedings of the 2005 Conference on Applications, Technologies, Architectures, and Protocols for Computer Communications, Aug. 22, 2005, 12 pages.
Kazemian et al., "Header Space Analysis: Static Checking for Networks", In the Proceedings of the 9th USENIX Conference on Networked Systems Design and Implementation, Apr. 25, 2012, 14 pages.
Koponen et al., "Network Virtualization in Multi-Tenant Data Centers", In the Proceedings of the 11th USENIX Conference on Networked Systems Design and Implementation, Apr. 2, 2014, pp. 203-216.
Koponen et al., "Onix: A Distributed Control Platform for Large-scale Production Networks", In the Proceedings of teh 9th USENIX Conference on Operating Systems Design and Implementation, Article 1-6, Oct. 4, 2010, 14 pages.
Liu et al., "zUpdate: Updating Data Center Networks with Zero Loss", In the Proceedings of the ACM SIGCOMM Conference on SIGCOMM, Aug. 12, 2013, pp. 411-422.
Mai et al., "Debugging the Data Plane with Anteater", In the Proceedings of the ACM SIGCOMM 2011 Conference, Aug. 15, 2011, 12 pages.
McKeown et al., "OpenFlow: Enabling Innovation in Campus Networks", In the Proceedings of the ACM SIGCOMM Computer Communication Review, vol. 38, Iss. 2, Apr. 2008, pp. 69-74.
Mogul et al., "Corybantic: Towards Modular Compsition of SDN Control Programs", In the Proceedings of teh 12th ACN Workshop on Hot Topics in Networks, Nov. 21, 2013, 7 pages.
Monsanto et al., "Composing Software-defined Networks", In the Proceedings of the 10th USENIX Conference on Networked Systems Design and Implementation, Apr. 2, 2013, pp. 1-13.
"Open-Source SDN Stack", retrieved on Mar. 11, 2014 at <<onlab.us/tools.html#os>>, On.Lab, 2013.
Patel et al., "Ananta: Cloud Scale Load Balancing", In the Proceedings of the ACM SIGCOMM 2013 Conference on SIGCOMM, Aug. 12, 2013, pp. 207-218.

(56) References Cited

OTHER PUBLICATIONS

Sherwood et al., "Can the Production Network be the Testbed?", In the Proceedings of the 9th USENIX Conference on Operating Systems Design and Implementation, Art. 1-6, Oct. 4, 2010, 14 pages.
Stribling et al., "Flexible, Wide-area Storage for Distributed Systems with WheelFS", In the Proceedings of the 6th USENIX Symposium on Networked systems Design and Implementation, Apr. 22, 2009, 16 pages.
"Summary of the Dec. 24, 2012 Amazon ELB Service Event in the US-East Region", retrieved on Mar. 11, 2014 at <<aws.amazon.com/message/680587>>, Amazon Web Services, 2014.
Terry, "Replicated Data Consistency Explained Through Baseball", Microsoft Technical Report, Oct. 2011, 14 pages.
Vanbever et al., "Seamless Network-wide IGP Migrations" In the Proceedings of the ACM SIGCOMM 2011 Conference, Aug. 15, 2011, pp. 314-325.
Voellmy et al., "Maple: Simplifying SDN Programming Using Algorithmic Policies", In the Proceedings of the ACM SIGCOMM 2013 Conference on SIGCOMM, Aug. 12, 2013, pp. 87-98.
Wang et al., "R3: Resilient Routing Reconfiguration", In the Proceedings of the ACM SIGCOMM 2010 Conference, Aug. 30, 2010, 12 pages.
Wu et al., "NetPilot: Automating Datacenter Network Failure Mitigation", In the Proceedings of the ACM SIGCOMM Computer Communication Review, vol. 42, Iss. 4, Aug. 13, 2012, 12 pages.
Wu et al., "SPANStore: Cost-effective Geo-Replicated Storage Spanning Multiple Cloud Services", In the Proceedings of the Twenty-Fourth ACM Symposium on Operating Systems Principles, Nov. 3, 2013, pp. 292-308.
Office action for U.S. Appl. No. 14/298,820, mailed on Feb. 10, 2016, Mahajan et al., "Proactive Handling of Network Faults", 10 pages.
Office action for U.S. Appl. No. 14/298,794, mailed on Mar. 23, 2016, Mahajan et al., "Dynamic Scheduling of Network Updates", 18 pages.
PCT Second Written Opinion mailed Apr. 18, 2016 for PCT Application PCT/US15/33860, 5 pages.
"International Preliminary Report on Patentability Issued in PCT Application No. PCT/US2015/034089", Mailed Date: May 26, 2016, 7 Pages.

\* cited by examiner

NETWORK-STATE MANAGEMENT SERVICE

BACKGROUND

As electronic services (e.g., search services, electronic mail services, social networking services, cloud computing services, etc.) continue to expand, providers of the electronic services operate networks of devices to provide the electronic services. However, due to the large number of interconnected and dependent devices within an individual network, it is often difficult for a provider to continuously operate a network in an efficient and reliable manner. For instance, a switch device within a network may be tasked with communicating a message from a source device to a destination device but may be unable to communicate the message because at a given moment, when the message is to be communicated via the switch device, an application that maintains and updates the switch device may have disabled at least some of the functionality of the switch device, e.g., so that it can receive a firmware update. Consequently, the network may experience an interruption that may affect the efficiency and reliability of the network.

Furthermore, multiple applications may attempt to simultaneously control a state of a network device resulting in a state conflict. For example, a first application may attempt to route traffic through the switch device while a second application attempts to shut down the switch device so that it can receive an update.

SUMMARY

The techniques and/or systems described herein implement a network management service configured to read and write a state of a network for various applications (e.g., network management applications) so that the applications can operate independently. The network management service is configured to read an observed network state (e.g., values for individual state variables of the network) and provide the observed network state to the applications. Subsequently, the network management service receives proposed network states from the applications, where each proposed network state suggests at least one change to a desired value of a state variable (e.g., an observed value or a current value). The network management service is then configured to determine, using a state dependency graph, whether state conflicts exist between the proposed network states and whether defined policies are violated by the proposed network states. Finally, the network management service is configured to generate a target network state by merging non-conflicting proposed network states that comply with defined policies and to update (e.g., write) the network state based on the generated target network state (e.g., change the network from an observed network state or a current network state to the target network state).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

Figure 1:
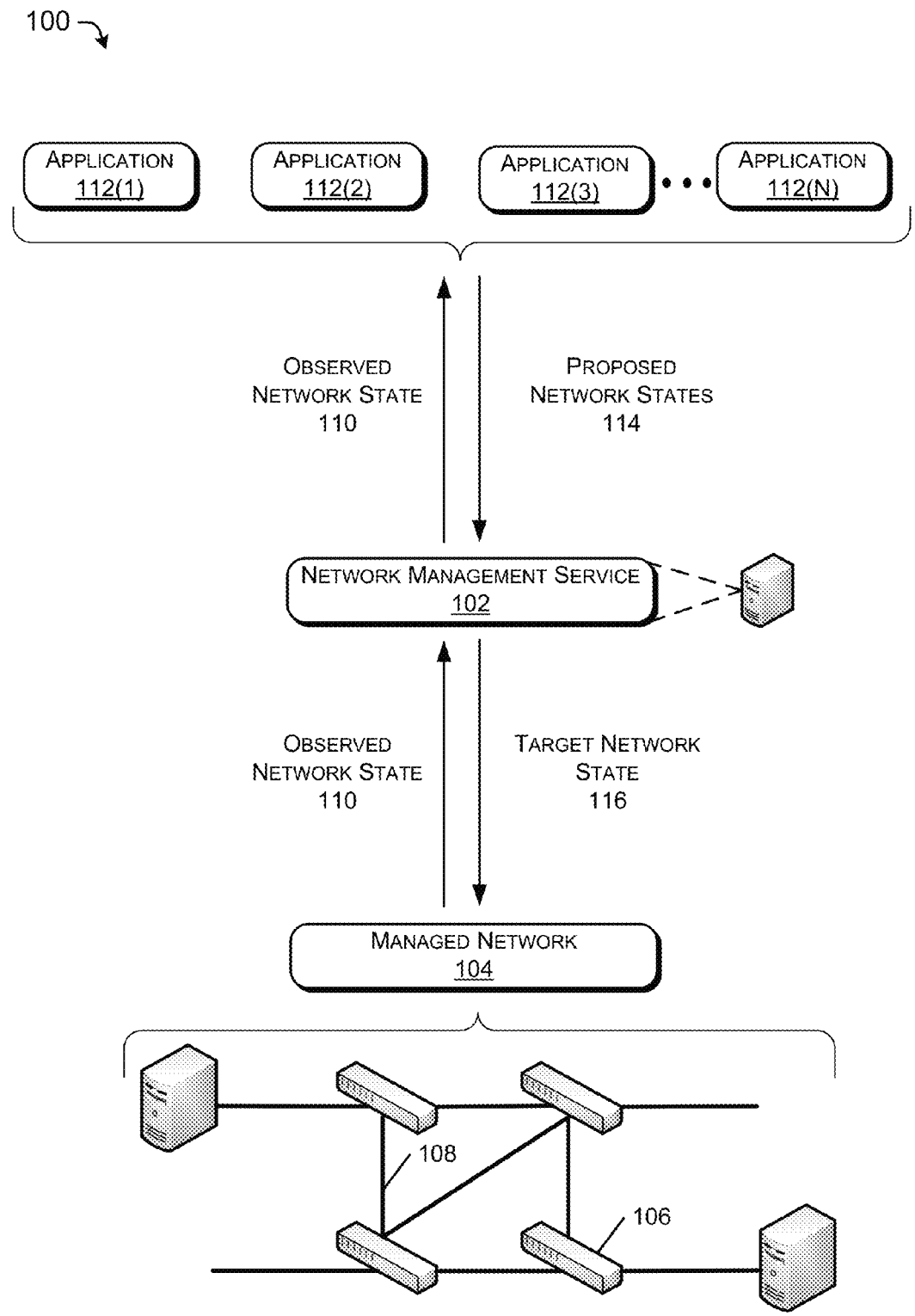
FIG. 1 illustrates an example diagram of a network management service that reads an observed state of a network, provides the observed state to various applications, and determines a target state for the network based on proposed states received from the various applications, in accordance with various embodiments.

The techniques and/or systems described herein implement a network management service that monitors and manages a network. The network may comprise various types of devices configured to perform various functions. The network may also comprise various communication paths between the devices. The network management service described herein enables applications (e.g., network management applications) to operate independently. The network management service is configured to read an observed network state and provide the observed network state to the applications. The network management service is also configured to determine, using a state dependency graph, whether state conflicts exist between proposed network states received from the applications. Moreover, the network management service is configured to determine whether defined policies are violated by the proposed network states. Finally, the network management service is configured to generate a target network state by merging non-conflicting proposed network states that comply with defined policies and to update (e.g., write) the network state based on the generated target network state. Consequently, the network management service described herein enables the network to continuously operate safely and efficiently at least because state conflicts are avoided and proposed network state changes are checked to ensure they comply with defined network policies.

As used herein, the "state" of a network is dependent on the states of individual devices and/or individual communication paths within the network. Accordingly, the network management service described herein is configured to observe (e.g., read), store and aggregate the state of individual devices and/or individual communication paths within the network so that a state of the broader network can be determined. In various implementations, an individual device or an individual communication path may have one or more state variables and at any given time a state variable may be any one of various values.

A state variable is defined as any component of a device or a communication path that may have a value capable of being read and/or written. For instance, a state variable may be a controllable component of a device for which an observed value can be read and a target value can be written. A state variable may be an uncontrollable component of a device for which an observed value can be read but a target value cannot be written (e.g., an application may want to know a value of an uncontrollable or "read-only" state variable to propose a desired value for another state variable). A state variable may also be associated with virtual component of a network.

A state variable may also be referred to as a key-value pair where (i) the key uniquely identifies the state variable and/or a particular device or communication path associated with the state variable and (ii) the value identifies one of the possible values for the state variable. For example, a device may comprise a power state variable that indicates whether a device is powered on or powered off. Thus, a first value for the power state variable may indicate the device is powered on and a second value for the power state variable may indicate the device is powered off. These different values can be read from the device (e.g., observed) and/or written to the device (e.g., the power is a controllable component of the device such that the network management service can switch the device between being powered on or powered off). Thus, the state of a network is a collection or aggregation of state variables associated with individual devices and/or individual communication paths within the network (e.g., a table of key-value pairs).

Typically, various applications individually access a device and control a state variable of the device. For example, an application typically monitors a state variable of a device, determines a time to update the device based on the monitoring, logs-on to the device to control the state variable (e.g., change the state variable from an observed or current value to a desired value) and then issues a command to update the device. These various applications may be created and/or operated by different, independent developers and/or entities tasked with managing and controlling different aspects or functions of the device and/or of the network of which the device is a part so that the device and the network operate efficiently and reliably (e.g., the network performs as it should). An application implementing an update to a device in the network is typically not aware of updates being implemented or about to be implemented on the same device by other applications. Thus, multiple independently operated applications often attempt to control a same state variable of a same device simultaneously. In many instances, a state variable value required to implement a first update by a first application may inadvertently affect a second update being implemented by a second application. For example, the first update may require that the state variable be a first value while the second update may require that the state variable be a second value different than the first value. Consequently, a state conflict arises and this state conflict may diminish the efficiency and reliability of the network and also frustrate the developers and/or the entities that control the applications implementing the updates.

As an illustrative example, suppose a traffic-engineering application wants to create a communication tunnel through a switch device within the network while a firmware-upgrade application wants to upgrade the same switch device. In many instances and depending on which application initiates actions on the switch device first, either (i) the traffic-engineering application fails to create the communication tunnel because the switch device may already be shut down (e.g., a power state variable indicates the switch device is powered off) so that the firmware-upgrade application can upgrade the switch device, or (ii) the communication tunnel already established by the traffic-engineering application may ultimately drop communication traffic after or upon the switch device being powered off by the firmware-upgrade application so that the firmware can be upgraded.

A conventional approach to resolving a state conflict includes implementing a system where applications negotiate with each other and agree in advance on a particular value for a state variable of a device at a given time so that a state conflict can be avoided. However, this conventional approach requires coordination and communication between each pair of applications, and thus, the applications become dependent on one another (e.g., tightly coupled applications that must be programmed to communicate in a common language). Moreover, this conventional approach causes development complexity and scalability challenges at least because a large amount of operating overhead is required so that each application can negotiate with many other applications to agree on a particular value for a state variable to avoid conflicts. For instance, an application that wants to update a device may need to communicate, to tens or hundreds of other applications, a desired value for a state variable of a device and then receive approval from the tens or hundreds of other applications before changing the state variable from an observed or current value to the value desired to implement the update.

The techniques and/or systems described herein implement a shared network management service that enables a coordinated and organized approach for various applications to independently implement changes to a state of the network. The shared network management service takes the responsibility of resolving state conflicts away from the applications and ensures that state conflicts are avoided. This allows applications to operate independently of one another (e.g., applications do not have to communicate and negotiate with other applications) and resolves the development complexity and scalability challenges mentioned above. Moreover, techniques and/or systems described herein reduce the latency for state conflict resolution and policy checking.

As discussed herein, the network management service generates, maintains and uses a state dependency graph to detect state conflicts. The state dependency graph captures and/or represents network-specific (e.g., domain-specific) dependencies between state variables. A dependency may be defined for two or more state variables associated with a same device or a same communication path within the network. Or, a dependency may be defined between a first state variable associated with a first device or a first communication path and a second state variable associated with a second device or a second communication path. The network management service accesses the state dependency graph to determine that a state conflict exists (e.g., detect a state conflict) and to resolve the state conflict.

Moreover, the network management service may ensure the network, at any given time, does not violate a policy (e.g., an invariant). For instance, a policy may be, or at least be associated with, a service level agreement (SLA). A service level agreement may be a network-wide service level agreement established and enforced to ensure that the network operates at or above a reliability and/or performance standard. For example, a service level agreement may be defined to ensure the network operates at or above a minimum network connectivity level (e.g., at least ninety percent of switch devices in the network are required to be powered on at any given time). Accordingly, the network management service examines defined policies and ensures that any changes to the state of the network (e.g., changes to state variables) do not cause a violation of a defined policy.

FIG. 1 illustrates an example diagram 100 that includes a network management service 102 managing a network 104. The network 104 may comprise a variety of devices 106 and communications paths 108. A communication path 108 may be associated with a direct link that connects two devices or may comprise an indirect link that connects two devices in which traffic is communicated via at least one intermediary device located between the two devices (e.g., end-point devices). In one implementation, a communication path 108 may comprise a communication tunnel through two or more devices.

In various embodiments, the network 104 being managed may be a large production network such as a data-center network (DCN), an Internet service provider (ISP) network, an enterprise network (e.g., a cloud service) or any other administrative domain that may be under control of an entity (e.g., an entity that operates and maintains devices executing the network management service 102). The devices 106 may be physical network devices such as a switching device (a switch), a routing device (a router), a gateway device (a gateway), a bridging device (a network bridge), a hub device (a network hub), a firewall device, a network address translator device (a NAT), a multiplexing device (a multiplexer), a wireless access point device (a WAP), a proxy server device, a file server device, a database server device, a storage device, etc. The devices 106 may also be end-user devices capable of connecting to the network 104. For instance, an end-user device may comprise a mobile or portable device such as a smart phone, a cellular phone, a personal digital assistant (PDA), an electronic book device, a laptop computing device, a tablet computing device, a personal media player device, etc. Or, an end-user device may comprise a stationary device such as a desktop computing device, a gaming console device, a digital video recording device (a DVR), a set top box device, etc. Therefore, the network 104 may comprise hundreds or thousands of devices connected to one another to comprise a domain or an administrative network.

As part of the management and administration of the network 104, the network management service 102 is configured to monitor and store an observed network state 110 (e.g., read the observed network state 110). The observed network state 110 comprises a collection or an aggregation of values to state variables of the devices 106 and/or communication paths 108 that make up the network 104 at a given time (e.g., real-time values, most recently observed values, etc.). For example, an individual device 106, at a given time, may be observed to have a power state variable with a first value indicating that the power is turned on or a second value indicating that the power is turned off.

After reading the observed network state 110 (e.g., observed values for state variables), the network management service 102 is configured to store the observed network state 110 and/or to provide (e.g., communicate) the observed network state 110, or at least part of the observed network state 110 (e.g., values for specified state variables), to various applications 112(1) . . . 112(N). In one implementation, the applications 112(1) . . . 112(N) may request and/or access the observed network state 110 (e.g., "pull" the observed network state 110 from the network management service 102). In another implementation, the network management service 102 may automatically provide the observed network state 110 to the applications 112(1) . . . 112(N) (e.g., "push" the observed network state 110 to the applications 112(1) . . . 112(N)). In instances where the network is a large production network, the number of applications N may be large (e.g., ten, fifty, one hundred, one thousand, etc.).

An application (e.g., one of 112(1) . . . 112(N)) may be responsible for managing and controlling a particular aspect or function of the network 104 so that the network 104 operates efficiently and reliably. Thus, the applications 112(1) . . . 112(N) may be highly sophisticated applications that take years to design, develop, and deploy in a large-production network. In various embodiments, the particular aspect or function of the network 104 managed and controlled by an individual application (e.g., one of 112(1) . . . 112(N)) may be associated with a single device 106 and/or a single communication path 108 of the network or a subset of the devices 106 and/or a subset of communication paths 108 of the network (e.g., a particular type of devices such as network switching devices). Accordingly, the individual application may request, or be provided with, observed state values for specific state variables associated with the devices 106 and/or communication paths 108 which the individual application is configure to manage and control (i.e., the individual application may not need to understand observed state values for all the state variables of the network 104).

An application (e.g., one of 112(1) . . . 112(N)) may be classified as a routing management application that manages switch forwarding rules for the devices 106 and/or the communication paths 108 of the network 104. For example, a traffic-engineering application may be a routing management application that is configured to steer traffic along different communication paths 108 (e.g., a communication tunnel established through/for two or more devices 106) to improve network utilization and/or ensure that performance requirements are satisfied. In another example, a server load balancing application may be a routing management application that equally divides a communication load (e.g., traffic) across devices (e.g., a group of servers processing requests for data).

An application (e.g., one of 112(1) . . . 112(N)) may be classified as an infrastructure management application that manages the network infrastructure of devices 106 and/or communication paths 108 of the network 104. For example, a power management application may be an infrastructure management application that is configured to turn a switching device on or off at any given time in order to mitigate a failure or save energy. In another example, a switch upgrade application may be an infrastructure management application that is responsible for installing a new operating system (i.e., firmware) on a switching device. In yet another example, a configuration management application may be an infrastructure management application that is configured to manage switching device configurations and communication path configurations (e.g., specify a management plane, implement a link layer discovery protocol (LLDP), perform Internet Protocol (IP) assignment, etc.).

The applications described above are provided herein as example applications, and it is contemplated that other applications developed to control an aspect or a function of a network may also benefit from the techniques and/or systems described in this document.

Subsequent to providing the observed network state 110, or values for specific state variables, to the applications 112(1) ... 112(N), the network management service 102 receives proposed network state(s) 114 from the applications 112(1) ... 112(N). An application (e.g., one of 112(1) ... 112(N)) may desire a particular change to values of one or more state variables in the observed network state 110 (e.g., to update a device), and therefore, the application may generate and communicate a proposed network state 114 that suggests the particular change (e.g., change an observed or current value of a state variable to a desired value of the state variable).

The network management service 102 is then configured to merge the proposed network state(s) 114 and generate a target network state 116. The target network state 116 for the managed network 104 is based on the proposed network state(s) collectively received from the various applications 112(1) ... 112(N). The target network state 116 comprises a group of accepted changes to values of state variables that can be implemented simultaneously and that do not result in a state conflict or a violation of a defined network policy (e.g., a service level agreement). The network management service 102 may access and use the state dependency graph discussed above to determine whether a conflict exists between two or more changes suggested via the proposed network states 114. The network management service 102 may also access defined policies and determine whether changes suggested via the proposed network states 114 result in a policy violation. Consequently, the network management service 102 may have to reject some changes suggested via the proposed network states 114 if it is determined that a conflict exists or a defined policy is violated. Put another way, the target network state 116 may not implement all the suggested state variable changes received via the proposed network states 114. Once the target network state 116 is generated, the network management service 102 initiates the changing of state variables (e.g., from a previously observed state value or a current value to a desired value).

Thus, the network management service 102 described above and further discussed herein is configured to shield the applications 112(1) ... 112(N) from interactions associated with controlling and managing the network 104 (e.g., one or more devices 106) and/or from having to understand dependencies between state variables. Instead, the network management service 102 handles the interactions and understands the dependencies between state variables. Therefore, the applications 112(1) ... 112(N) are not required, on their own, to implement a device-specific and/or a protocol-specific approach to reading and/or writing a state variable. Moreover, since the network management service 102 does not enable the applications 112(1) ... 112(N) to directly and unilaterally control the devices 106 and/or communication paths 108 in the managed network 104, state conflicts can be detected thereby mitigating a network failure or diminished network performance.

In various embodiments, the network management service 102 may interface with the applications 112(1) ... 112(N) using application programming interfaces (APIs).

Figure 2:
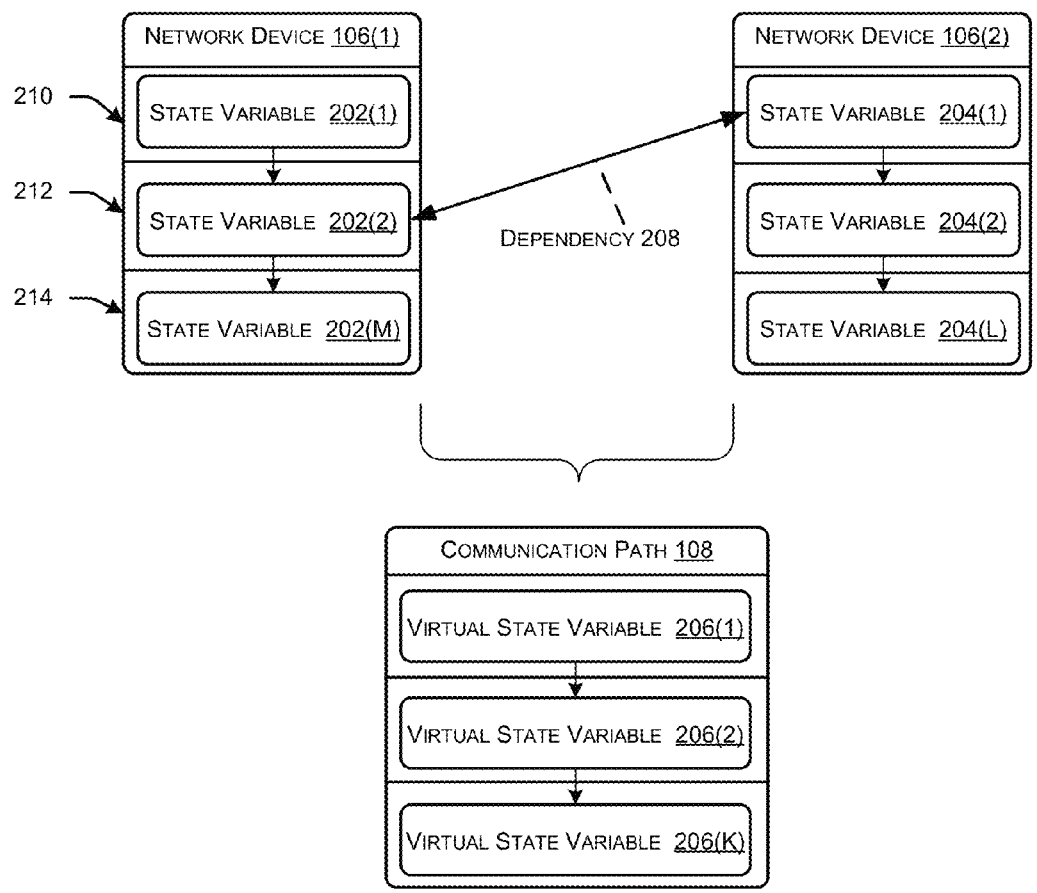
FIG. 2 illustrates example state variable dependencies within a single device, across multiple devices, and for a communication path, in accordance with various embodiments.

FIG. 2 is a diagram 200 illustrating state variable dependencies for a single device, across multiple devices, and for a communication path. The diagram 200 illustrates a first device 106(1) and a second device 106(2) as well as a communication path 108 that connects the first device 106(1) to the second device 106(2) in the network 104. The communication path 108 may be a direct link or an indirect link, as discussed above.

The network management service 102 is configured to observe and store values for the state variables defined for the devices 106 and communication paths 108 in the network (e.g., a table of key-value pairs). Moreover, the network management service 102, when storing the values, may associate the observed state (e.g., a key-value pair) with a timestamp indicating when the value for a state variable was observed.

The first device 106(1) may be associated with state variables 202(1) ... 202(M). The second device 106(2) may be associated with state variables 204(1) ... 204(L). The communication path 108 may be associated with state variables 206(1) ... 206(K). In various embodiments, the state variables associated with devices 106(1) and 106(2) may be referred to as physical state variables and the state variables associated with a communication path 108 may be referred to as virtual state variables because they may not be a physical component of a device 106. Rather, a virtual state variable may be a component that is related to physical state variables associated with a device. The network management service 102 may be configured to translate a virtual state variable to one or more physical state variables based on the relation.

Example state variables for individual devices 106(1) and 106(2) include, but are not limited to, one or more of: device power state variables (e.g., a power unit reachability state variable, an administrative power status state variable, etc.), firmware setup state variables (e.g., a firmware version state variable, a boot image state variable, etc.), a device configuration state variable (e.g., a management interface setup state variable, a wiring status state variable, etc.), routing control state variables (e.g., a flow routing rules state variable, a link weight allocation state variable, etc.), and device counter state variables (e.g., a CPU utilization state variable, a memory utilization state variable, etc.). Further example state variables for individual devices 106(1) and 106(2) may be associated with a communication interface and may include, but are not limited to, one or more of: interface power state variables (e.g., an interface administrative status state variable, an interface operation status state variable, etc.), interface configuration state variables (e.g., an IP assignment state variable, a boot status state variable, etc.), and interface counter state variables (e.g., a traffic load state variable, a packet drop rate state variable, etc.).

Example state variables for an individual communication path 108 may include, but are not limited to, setup and traffic state variables (e.g., a state variable that identifies switching devices on the communication path, a Multiprotocol Label Switching (MPLS) tunnel state variable, etc.).

The state dependency graph generated by the network management service 102 is based on defined dependencies between state variables of the network 104. Thus, the state dependency graph used by the network management service 102 to detect a state conflict may define a dependency so that an individual state variable cannot simultaneously have multiple values (e.g., a switching device cannot be powered up and powered off at the same time). For instance, the state dependency graph may be used to detect that a state conflict arises when a proposed network state received from a first application requests or suggests a first value for a state variable while a proposed network state received from a second application requests or suggest a second value different than the first value for the same state variable. Thus, a dependency can be defined with respect to an individual state variable.

The state dependency graph used by the network management service 102 to detect a state conflict may also define a relationship dependency between multiple state variables (e.g., at least two state variables). Put another way, whether a value of a state variable is changeable may depend on a value of one or more other state variables. The multiple state variables may be associated with the same device or same communication path. For instance, a particular value of state variable 202(1) may conflict with a particular value of state variable 202(2) or a particular value of state variable 206(1) may conflict with a particular value of state variable 206(2). In one example, a particular value for a device configuration state variable may depend on a particular value of a firmware version state variable (e.g., the firmware version may have to be the most recent upgraded operating system for the particular value of the device configuration state).

The multiple state variables may alternatively be associated with different devices or communication paths. For instance, FIG. 2 illustrates a defined dependency 208 between state variable 202(2) associated with device 106(1) and state variable 204(1) associated with device 106(2). As an example, a particular value for a device configuration state variable (e.g., state variable 202(2)) of device 106(1) may depend on whether a power state variable (e.g., state variable 204(1)) value of device 106(2)) indicates that device 106(2) is powered on.

In various embodiments, the network management service 102 structures the state variables based on layers. For instance, state variable 202(1) may be part of a first layer 210. State variable 202(2) may be part of a second layer 212. And state variable 202(M) may be part of an Mth layer 214 (e.g., where M is an integer value). The layers defined within the structure may be based on a type or a category of state variable. In one implementation, layer 210 may include state variables of the power type or power category, layer 212 may include state variables of the device configuration type or the device configuration category, and layer 214 may include state variables of the routing control type or the routing control category.

Since an application (e.g., one of applications 112(1) ... 112(N)) may be tasked with controlling and managing a particular aspect or function of the network, the application may only be interested in understanding and controlling a small number of state variables associated with the particular aspect or function of the network. Therefore, the network management service 102 may structure or organize the state variables according to layers so that an application can efficiently obtain observed values for state variables within a particular layer relevant to the particular aspect of function of the network for which the application is managing and controlling. Continuing the example in the preceding paragraph, a power management application may only want to receive and understand observed values of state variables in layer 210 (e.g., those of the power type or power category). Or, a traffic-engineering application may only want to receive and understand observed values of state variables in layer 214 (e.g., those of the routing control type or routing control category).

Figure 3:
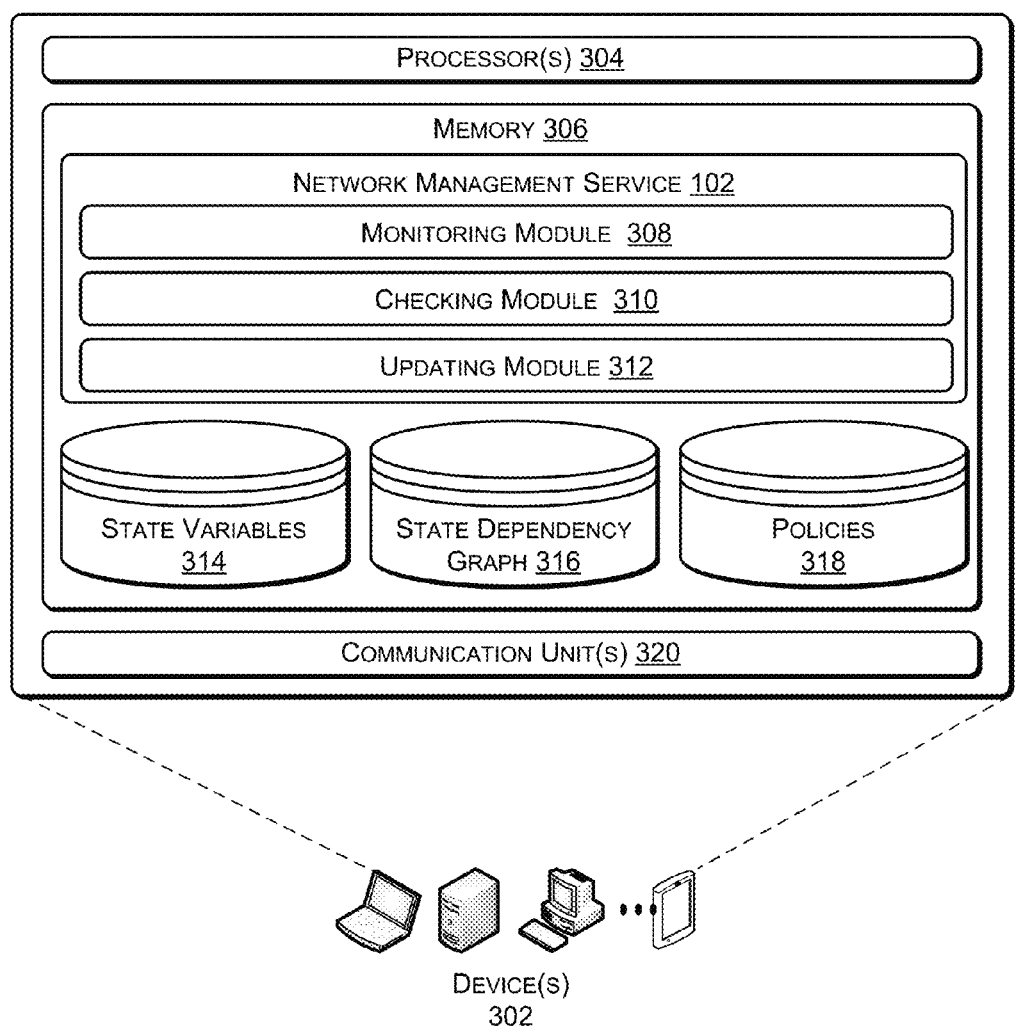
FIG. 3 illustrates an example environment that describes components of one or more devices configured to implement the network management service, in accordance with various embodiments.

FIG. 3 is a diagram showing an example environment 300 that implements the network management service 102 described above. In various embodiments, the network management service 102 may be implemented via one or more devices 302. A device 302 may comprise a stationary device such as a desktop computing device, a server computing device, or the like. A device 302 may alternatively comprise a mobile or portable device such as a laptop computing device, a tablet computing device, a smart phone device, a cellular phone device, a personal digital assistant (PDA) device, an electronic book device, or the like.

The device(s) 302 include the network management service 102 configured to implement the techniques described herein. A device 302 may individually and separately include one or more processor(s) 304 and memory 306. The processor(s) 304 may be a single processing unit or a number of units, each of which could include multiple different processing units. The processor(s) 304 may include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-programmable Gate Array (FPGA), an Application-specific Integrated Circuit (ASIC), an Application-specific Standard Products (ASSP), a state machine, a Complex Programmable Logic Device (CPLD), other logic circuitry, a system on chip (SoC), and/or any other devices that perform operations based on instructions. Among other capabilities, the processor(s) 304 may be configured to fetch and execute computer-readable instructions stored in the memory 306.

The memory 306 may include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PRAM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a device.

In contrast, communication media includes computer-readable instructions, data structures, program modules, or other data in a modulated data signal, such as a carrier wave. As defined herein, computer storage media does not include communication media.

The memory 306 may include an operating system that is configured to manage hardware and services within and coupled to a device for the benefit of other modules, components and devices. In some instances, at least part of the network management service 102 may be implemented within, or by, the operating system.

The network management service 102 includes one or more of a monitoring module 308, a checking module 310 and an updating module 312. As used herein, the term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on one or more processors across one or more devices, in other embodiments, any or all of the modules may be implemented in whole or in part by hardware (e.g., as an ASIC, a specialized processing unit, etc.) to execute the described functions. In other instances, the functions and/or modules are implemented as part of a device driver, firmware, and so on.

The monitoring module 308 is configured to read, or observe, a current or actual network state (i.e., the observed network state 110) of the managed network 104. As discussed above, the observed network state 110 comprises values for various state variables of the devices 106 and communication paths 108 of the managed network 104 at a given time. After reading the values of the state variables, the monitoring module 308 is configured to store the observed values in a state variables store 314. For instance, the monitoring module 308 may organize or structure the observed values in the state variables store 314 according to key-value pairs (e.g., a table of key-value pairs). By storing the observed network state 110, the most recent observed values for state variables can be accessed at a later time after the observed values are read by the monitoring module 308. In some implementations, the key-value pairs may be sorted according to devices 106 and/or communication paths 108, as well as a type or a category of state variables (e.g., the layers discussed above).

In various implementations, the monitoring module 308 may be configured to read up-to-date state variable values of the devices 106 and/or of the communication paths 108 in accordance with a periodic schedule (e.g., every thirty seconds, every minute, every three minutes, every ten minutes, every thirty minutes, every hour, a particular time every day, etc.). In other implementations, the monitoring module 308 may be configured to read up-to-date state variable values of the devices 106 and/or of the communication paths 108 in response to a particular event. For example, the particular event may include a specific instruction initiated by a representative (e.g., network administrator) from an entity operating the network management service 102 or an entity served by the managed network 104 (e.g., an enterprise entity). In another example, the particular event may be a network failure or network disruption.

In various embodiments, the monitoring module 308 reads and collects the values for state variables using various protocols. For example, a protocol used by the monitoring module 308 to read a value may depend on a vendor or manufacturer of a device 106 (e.g., a switching device) and/or the physical technologies supported by the device 106 (e.g., Simple Network Management Protocol (SNMP), OpenFlow communications protocol, etc.). The monitoring module 308 then translates protocol-specific data into state variable values to be stored in the state variables store 314 and/or to be provided to the applications 112(1) . . . 112(N). Since the monitoring module 308 may be configured to implement different protocols to read values of state variables from different devices (e.g., devices manufactured by different entities), the monitoring module 308 is able to shield the applications 112(1) . . . 112(N) from the heterogeneous nature of the different devices 106. Put another way, the monitoring module 308 may translate and persistently store state variable values in a unified format so that the applications 112(1) . . . 112(N) do not have to know or understand specific infrastructure technologies and/or protocols used to read and write state variable values.

The monitoring module 308 is further configured to provide observed state variable values to the applications 112(1) . . . 112(N). As discussed above, the provision of observed state variable values may be implemented via push techniques or pull techniques. Moreover, an application may only want to understand, and therefore, be provided with specific state variable values relevant to the network function or network aspect for which it is responsible for controlling and managing. Accordingly, the monitoring module 308 may be configured to provide specific state variable values to a particular application. For example, a pull request from a particular application may indicate one or more keys which individually identify a state variable of a device 106 or of a communication path 108 and the monitoring module 308 provides the observed values for the one or more keys indicated in response to the pull request. In another example, the monitoring module 308 may be configured with logic that is aware of which state variable values are relevant to a particular application, and thus, the monitoring module 308 may automatically push specific state variable values to the particular application in accordance with a schedule (e.g., a periodic schedule) or in response to a particular event. Consequently, the monitoring module 308 may be configured as an intermediate interface available to applications 112(1) . . . 112(N) so that the applications can read observed values of state variables.

After receiving the observed network state 110 (e.g., one or more observed values), the applications 112(1) . . . 112(N) determine whether or not to suggest a change to an observed value. For instance, an application may determine that an observed value needs to be changed so that the application can update firmware on a device 106. Thus, the applications 112(1) . . . 112(N) are individually configured to generate and return one or more proposed network states 114 to the network management service 102. In various embodiments, each proposed network state 114 generated and provided by an application (e.g., one of applications 112(1) . . . 112(N)) may suggest a single change of a state variable from an observed value to a desired value. Thus, a single application may determine multiple value changes are needed, and therefore, the single application may provide multiple proposed network states 114. In other embodiments, an individual proposed network state 114 generated and provided by an application (e.g., one of applications 112(1) . . . 112(N)) may suggest multiple changes to multiple respective observed values.

In various embodiments, the checking module 310 is configured to receive the proposed network states 114 from the applications 112(1) . . . 112(N) and/or store the suggested changes (e.g., the desired values of the state variables) in the state variable store 314 so that the checking module 310 can begin determining whether state conflicts exist or whether a defined policy is violated.

After the proposed network states 114 are received, the checking module 310 is configured to generate the target network state 116. The checking module 310 generates the target network state 116 by detecting and removing conflicts between the proposed network states 114. For instance, if a conflict is detected between two or more proposed network states, the checking module 310 is configured to accept one proposed network state and reject at least one other proposed network state that conflicts with the accepted proposed network state. As an example, the checking module 310 may detect that a conflict exists when a first proposed network state and a second proposed network state (e.g., at least two proposed network state) suggests changing a state variable to a different value at a same time (e.g., simultaneously). In another example, the checking module 310 may detect that a conflict exists when a first proposed network state suggests a first desired value to a first state variable and a second proposed network state suggests a second desired value to a second state variable different than the first state variable, where the first desired value and the second desired value are incompatible (e.g., based on a defined dependency).

The checking module 310 determines whether a conflict exists by using the state dependency graph, e.g., stored in a state dependency graph store 316. As discussed above, the state dependency graph defines dependencies between state variables (e.g., a particular value of a first state variable may depend on a particular value of a second state variable). Thus, the checking module 310 accesses the state dependency graph to determine whether or not a conflict exists.

In various embodiments, the network management service 102 may define dependencies, e.g., within the state dependency graph, based on layers (e.g., between layers). For example, referring back to FIG. 2, state variable 202(1) may be part of a top layer 210 in a multi-layered dependency hierarchy. State variable 202(2) may be part of an intermediate layer 212 in the multi-layered dependency hierarchy, where state variables in the intermediate layer 212 depend upon at least one value of one or more state variables in the top layer 210. And state variable 202(M) may be part of a bottom layer 214 in the multi-layered dependency hierarchy, where state variables in the bottom layer 214 depend upon at least one value of one or more state variables in the intermediate layer 212. It is understood in the context of this document that the network management service 102 can generate the state dependency graph so that it includes any number of layers (e.g., two, four, six, eight, etc.).

The network management service 102 may use the multi-layered dependency hierarchy to efficiently determine whether or a not a state conflict exists. For instance, if a power state variable in a top layer 210 indicates the device is powered off, then most, if not all, of the state variables in a lower layer, such as the intermediate layer 212 (e.g., device configuration type state variables) and bottom layer 214 (e.g., routing control type state variables), may be invalid or null at least because the device is shut down and not operating thereby eliminating a possibility for applications to control and/or manage lower layer state variables that may require power. Put another way, the checking module may efficiently reject proposed network state associated with lower layer state variables of a device if a power state variable indicates that power to the device is shut off. Or, in some instances, applications may be informed that the power state variable indicates that power to the device is shut off, and therefore, the applications may not even propose and/or suggest a change to a lower layer state variable of the because the device is shut off.

In various embodiments, the checking module 310 resolves a detected conflict (e.g., selects a proposed network state to accept) using an example last-write-win mechanism (also referred to as a last-to-commit) or an example locking mechanism. Using the last-write-win mechanism, the checking module 310 is configured to accept a suggested change to a state variable based on when, e.g., a time, a proposed network state is received. For example, if the checking module 310 detects a conflict between two proposed network states, the checking module 310 accepts or selects a more recently (i.e., newer) received proposed network state instead of an older proposed network state that was received before the newer proposed network state.

Using the locking mechanism, the checking module 310 enables an application to exclusively lock a state variable before providing a proposed network state. The checking module 310 may also enable an application to exclusively lock a device 106 or a communication path 108 before providing a proposed network state which may affect multiple state variables associated with the locked device 106 or the locked communication path 108. Once a device, a communication path, and/or a state variable is/are locked (e.g., via an instruction to lock a specific state variable, a device 106 or a communication path 108), the checking module 310 will not accept state variable changes from applications other than the one or more applications that initiated the lock (e.g., a lock-holding application). Put another way, the checking module 310 rejects proposed network states that are associated with a lock if the proposing application is not a lock-holding application.

In additional embodiments, the checking module 310 resolves a detected conflict (e.g., selects a proposed network state to accept) using a priority-based mechanism. For instance, the checking module 310 may determine that a first application is responsible for controlling and managing a network function that may be more important and/or more valuable (e.g., the operation of network depends heavily on the network function) than a different network function controlled and managed by another application. Therefore, the checking module 310 may access a ranked or weighted application list that indicates one application has a priority over another application. In some implementations, the priority may indicate that a particular network function being controlled or managed has a priority over another network function.

The state variables and/or dependencies between state variables may be defined by one or more of an entity operating the network management service 102, a manufacturer or producer of network equipment (e.g., devices), a developer of an application (e.g., one of applications 112(1) . . . 112(N)) managing and controlling a network function or a network aspect, or an entity served by a network. Thus, the state dependency graph stored in the state dependency graph store 316 and accessible by the checking module 310 to determine whether or not a conflict between two proposed networks states exists may continue to evolve and/or be updated. For example, a particular state variable may be newly introduced to the state dependency graph or removed from the state dependency graph. Or a dependency between two state variables may be newly introduced to the state dependency graph or removed from the state dependency graph.

The checking module 310 also generates the target network state 116 by determining whether or not a defined policy is violated by the target network state 116 or by merging two or more proposed network states 114. Thus, the checking module 310 is configured to access and evaluate a policies store 318 to ensure that the target network state 116 does not violate any defined policies (e.g., is free of policy violations). By enforcing policies, the network management service 102 can ensure that network failures caused by applications (e.g., misbehaving applications) are mitigated or limited. For instance, after merging non-conflicting proposed network states to generate a target network state 116, the checking module 310 may determine whether or not the target network state 116 violates one or more service level agreements (SLAs). In one implementation, an SLA may define a policy that ensures the network operates at or above (i) a minimum network capacity level and/or (ii) a minimum reachability level to ensure that network topology remains connected so that devices that host services provided by the network can continue to operate efficiently (e.g., survive any single failure of a switching device).

A first example SLA may be defined to ensure that the network 104 is not partitioned. This example SLA relates to the topology characteristics of a network (e.g., a DCN) and may be associated with connectivity of Top-of-Rack (ToR)

switches. Specifically, this example SLA may require that any ToR switch can reach any other ToR in the same network based on the physical network topology. This example SLA may also require that any ToR switch can connect to the border routers within its network thereby indicating the ToR switch has wide-area network (WAN) reachability.

A second example SLA may be defined to ensure capacity between two devices (e.g., ToR switches). Therefore, this example SLA may ensure that capacity from a first ToR switch to a second ToR switch within the network satisfies a max-flow volume. The checking module 310 may calculate a current capacity of the ToR switch pair, and compare the calculated current capacity with an original capacity calculated for a designed network topology. This example SLA may be defined to ensure that a minimum percentage, p, of ToR switch pairs (e.g., ninety percent, ninety-five percent, etc.) within the network have at least pre-determined threshold, t, of an original capacity (e.g., fifty percent, sixty percent, etc.). The parameters p and t are configurable, and may be set by the network management service 102, an application (e.g., one of 112(1) . . . 112(N)) or another entity. For example the parameters may be set in accordance with balance factors, including, an amount of redundancy a network may have for tolerating capacity loss and/or traffic behaviors of services hosted by the network.

In various embodiments, policies may be implemented as functions over a network graph data structure of the network. The network graph data structure may contain the network topology and the functions may return Boolean results indicating whether or not the target network state 116 and/or non-conflicting merged proposed network states violate defined policies.

Similar to the state variables and/or dependencies, the policies may also be defined by one or more of an entity operating the network management service 102, a manufacturer or producer of network equipment (e.g., devices), a developer of an application (e.g., one of applications 112(1) . . . 112(N)) managing and controlling a network function or a network aspect, or an entity served by a network. Thus, the policies stored in the policies store 318 and accessible by the checking module 310 to determine whether a policy is violated may continue to evolve and/or to be updated.

The updating module 312 is configured to update the managed network in accordance with the target network state 116. Therefore, the updating module 312 may determine or calculate difference(s) between the observed network state 110 and the target network state 116 and generate specific commands (e.g., device-specific commands) to apply to the network based on the determined and/or calculated differences. For instance, the updating module 312 may maintain a command pool that contains command templates for individual update actions for a particular type of switching device (e.g., based on manufacturer and/or vendor), where an update action may be supported by various control protocols (e.g., a specific vendor API, Open-Flow, etc.). The updating module 312 may be configured to locate a command template in the command pool so that commands can be generated to correctly implement an update to a state variable. Consequently, the updating module 312 is configured to issue update commands on behalf of the applications 112(1) . . . 112(N) so that the applications do not have to understand the heterogeneous nature of updating various devices. Put another way, the network changes proposed by the applications (i.e., the proposed network states 114) may be generic and do not need to specify specific hardware commands to change a current state variable value to a desired state variable value.

In various embodiments, the updating module 312 may implement changes based on the target network state 116 in accordance with a schedule. For example, the updating module 312 may generate a final target network state 116 and begin implementing changes in accordance with a periodic schedule (e.g., every minute, every three minutes, every ten minutes, every hour, every three hours, every day, etc.). In various embodiments, the updating module 312 may be constantly moving the network from a current network state (e.g., the observed network state 110) to a target network state 116 (e.g., until convergence of the target network state 116 is realized). Thus, the updating module 312 may continue to update a network based on a target network state 116 that is continually evolving and being updated.

In various embodiments, a device 302 includes one or more communication unit(s) 320. The communication unit(s) 320 may be configured to facilitate a wired and/or wireless connection to one or more networks (e.g., network 104), applications 112(1) . . . 112(N) operated by various service or content providers, and/or other devices. Therefore, the communication unit(s) 320 may implement one or more of various communications or network connection protocols.

Figure 4:
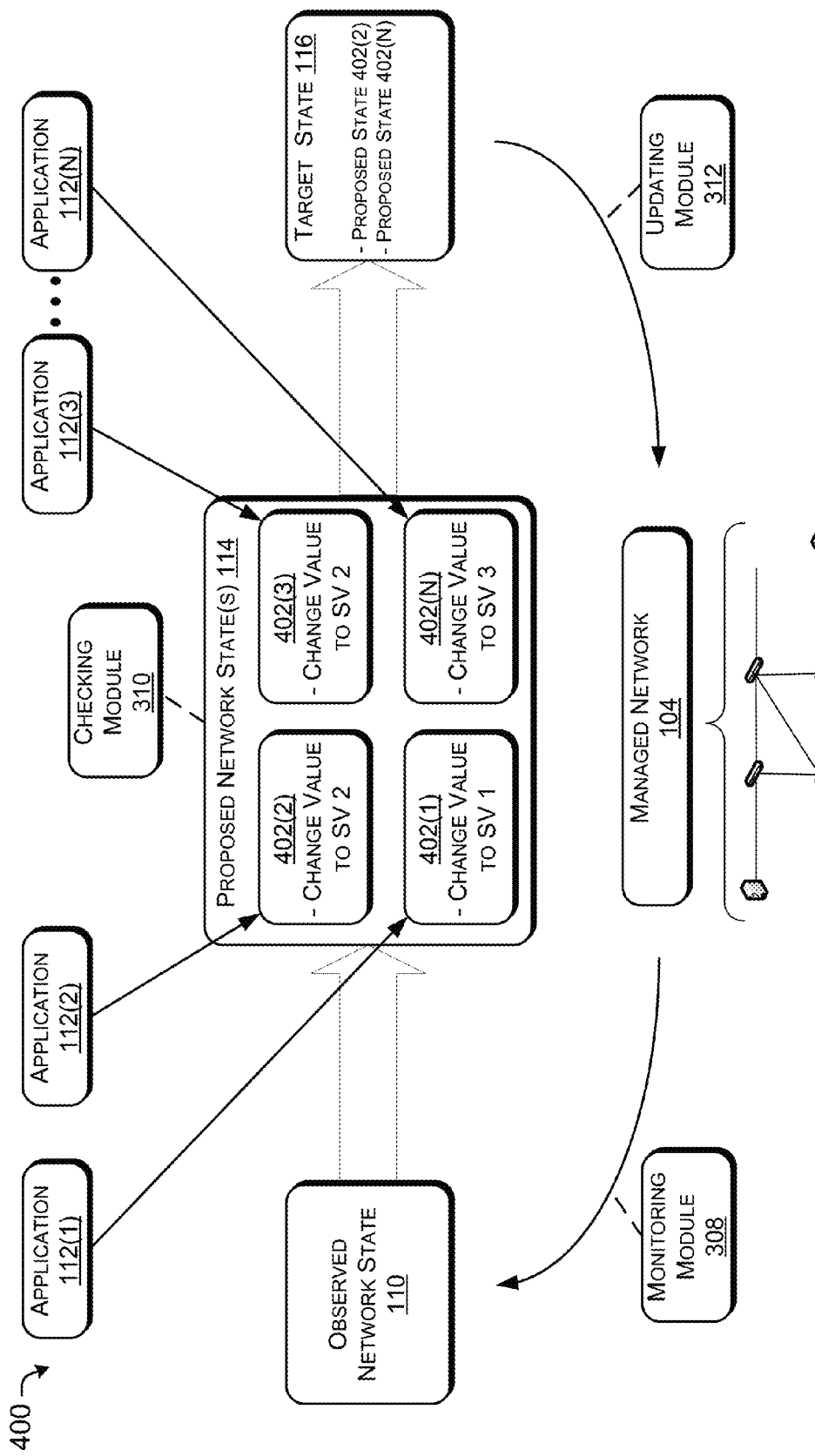
FIG. 4 illustrates an example diagram of the network management service that reads an observed network state and writes a target network state, in accordance with various embodiments.

FIG. 4 illustrates an example diagram of the network management service 102 reading and writing network state. For instance, at a given time, the monitoring module 308 reads and collects state variable values to aggregate the observed network state 110 of the managed network 104. At least part of the observed network state 110 (e.g., one or more specific state variable values) is provided to individual applications (e.g., each one of applications 112(1) . . . 112(N)). The individual applications evaluate the observed network state and submit proposed network states 114 specifying at least one change to a state variable. For example, application 112(1) may submit a proposed network state 402(1) that suggests changing the value of a first state variable, SV 1 (e.g., state variable 202(2) from FIG. 2). Application 112(2) may submit a proposed network state 402(2) that suggests changing the value of a second state variable, SV 2 (e.g., state variable 202(1) from FIG. 2). Application 112(3) may submit a proposed network state 402(3) that suggests changing the value of the second state variable, SV 2, as well. And application 112(N) may submit a proposed network state 402(N) that suggests changing the value of a third state variable, SV 3 (e.g., state variable 204(1) from FIG. 2).

As discussed above, the checking module 310 is configured to receive the proposed network states and determine that a conflict exists between proposed network states 402(2) and 402(3) because each of applications 112(2) and 112(3) may be suggesting that state variable 202(1) be changed to a different value. Thus, the checking module 310 may select and accept one of proposed network states 402(2) and 402(3) due to the detected conflict, and conversely, reject the other proposed network state. As discussed above, the selection may be made based on a last-write-win mechanism, a locking mechanism or a priority-based mechanism. Thus, FIG. 4 shows that the checking module 310 selects and accepts proposed network state 402(2) and merges the accepted proposed network state 402(2) with other non-conflicting proposed network states that comprise the target network state 116. Conversely, the checking module 310 rejects proposed network state 402(3).

Similarly, the checking module 310 is configured to determine that a conflict exists between proposed network states 402(1) and 402(N) because, e.g., as defined by the dependency 208 in FIG. 2, a desired value of state variable 202(2) suggested by application 112(1) may be incompatible with a desired value of state variable 204(1) suggested by application 112(N). Thus, the checking module 310 may select and accept one of proposed network states 402(1) and 402(N) due to the detected conflict, and conversely, reject the other proposed network state. FIG. 4 shows that the checking module 310 selects and accepts proposed network state 402(N) and merges the accepted proposed network state 402(N) with other non-conflicting proposed network states that comprise the target network state 116. Conversely, the checking module 310 rejects proposed network state 402(1).

In some implementations, the checking module 310 is configured to communicate an acceptance or rejection of a proposed network state to the applications so that the applications are aware of whether or not their suggested change can be implemented on the network. The checking module 310 may also, or alternatively, store an indication of whether a proposed network state was accepted or rejected so that the applications 112(1) . . . 112(N) can be informed of, and/or react to, an acceptance or rejection of a proposed network state. For example, the checking module 310 may store, e.g., in the state variables store 314, a status entry indicating: a proposed network state, the application that submitted the proposed network state, and/or reasons the proposed network state was accepted or rejected.

The updating module 312 is then configured to determine differences between the observed network state and the target network state 116 and update the managed network 104 so that the state changes from the observed network state to the target network state 116. In various embodiments, the observed network state used by the updating module 312 to determine the differences is the same observed network state 110 provided to the applications 112(1) . . . 112(N). In scenarios where the state of the network has changed after the observed network state 110 is initially provided to the applications 112(1) . . . 112(N), the observed network state used by the updating module 312 to determine the differences may be a more recent observed network state that includes one or more state variables that may be different than those included in the observed network state 110 provided to the applications 112(1) . . . 112(N). Put another way, the monitoring module 308 may have read updated values for one or more state variables after providing the observed network state 110 to the applications 112(1) . . . 112(N) and while the checking module 310 is generating the target network state 116.

Figure 5:
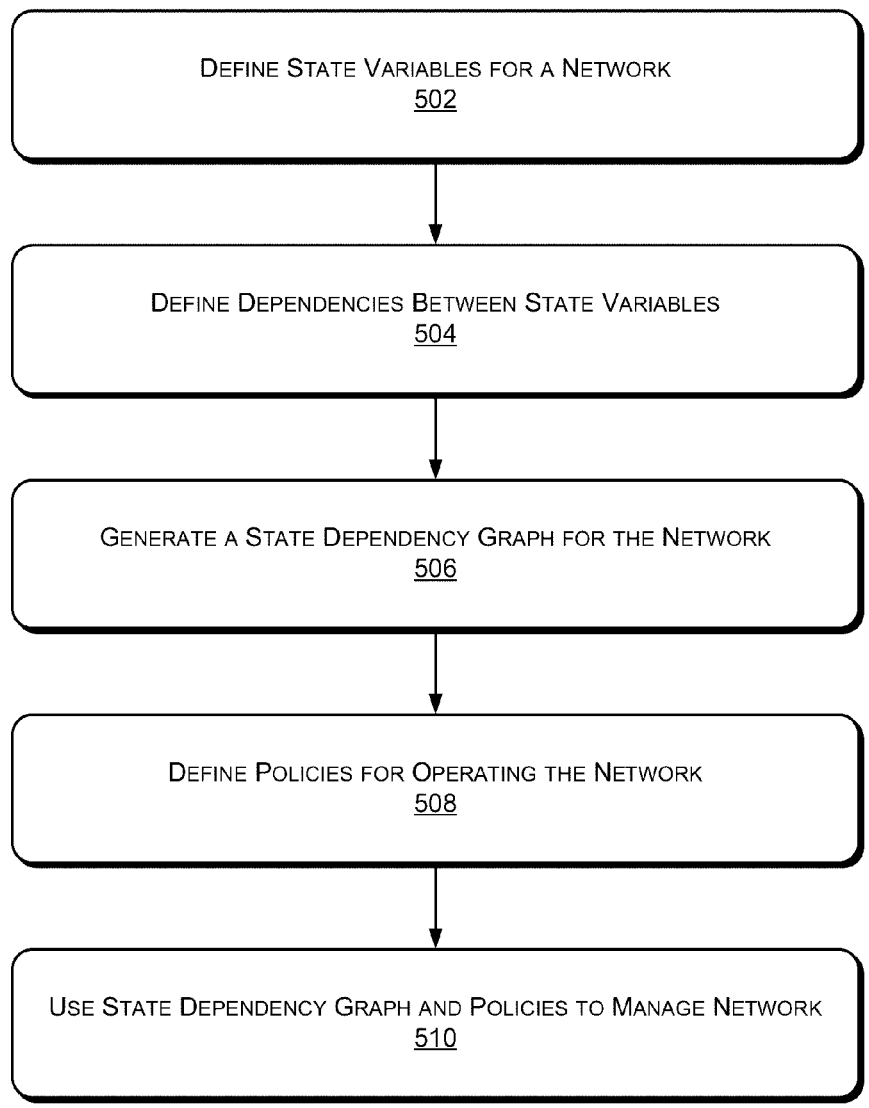
FIG. 5 illustrates an example process that generates a state dependency graph for use in detecting state conflicts for a network and that defines policies to operate the network, in accordance with various embodiments.

FIG. 5 illustrates an example process depicted as a logical flow graph, which represents a sequence of operations that can be implemented in hardware, software, firmware, or a combination thereof. In the context of software, the operations represent computer-executable instructions that, when executed by one or more processors, configure a computing device to perform the recited operations. Generally, computer-executable instructions include routines, programs, objects, components, data structures, and the like that configure a computing device to perform particular functions or implement particular abstract data types. In some embodiments, any or all of the operations may be implemented in whole or in part by hardware (e.g., as an ASIC, a specialized processing unit, etc.) to execute the described functions. In some instances, the functions and/or modules are implemented as part of an operating system. In other instances, the functions and/or modules are implemented as part of a device driver, firmware, and so on.

The order in which the operations are described is not intended to be construed as a limitation, and any number of the described operations can be combined in any order and/or in parallel to implement the processes.

FIG. 5 illustrates an example process 500 that generates a state dependency graph for a network and defines policies to operate the network. The example operations in FIG. 5 may be described with reference to the modules, components and/or elements illustrated in any one of FIGS. 1-4.

At 502, the network management service 102 is configured to define state variables for a network or receive state variable definitions. The state variables may be defined by applications that manage the network (e.g., applications 112(1) . . . 112(N)), by vendors or manufacturers of network equipment (e.g., devices 106), and/or by the network management service 102.

At 504, the network management service 102 is configured to define dependencies between state variables. The dependencies may also be defined by applications that manage the network (e.g., applications 112(1) . . . 112(N)), by vendors or manufacturers of network equipment (e.g., devices 106), and/or by the network management service 102. For example, a device-configuration control application that may want to propose that a device configuration state variable be changed from a first configuration (e.g., a first value) to a second configuration (e.g., a second value) may understand that the second configuration of the device depends on a particular value of a firmware version state variable (e.g., the device is required to be running a new operating system instead of an older operating system). Dependencies may also be defined for an individual state variable (e.g., a state variable may not simultaneously have two different values).

At 506, the network management service 102 is configured to generate a state dependency graph for the network. The state dependency graph is generated based on the dependencies defined in operation 504 to ensure that state conflicts can be detected and resolved before the network is updated. Thus, the efficiency and reliability of the network is improved, e.g., at least because two or more independently operated applications are unable to attempt to (i) simultaneously control (e.g., directly write to) the same state variable (e.g., set the state variable to two or more different values) and (ii) change two or more state variables to values that may be incompatible and/or damaging to the network.

At 508, the network management service 102 is configured to define policies for operating the network. Again, the policies may be defined by applications that manage the network (e.g., applications 112(1) . . . 112(N)), by vendors or manufacturers of network equipment (e.g., devices 106), by the network management service 102 (e.g., an entity that administers the network), and/or by an entity being served by the network (e.g., a company, an education establishment, a non-profit organization, etc.). In various embodiments, the policies are service level agreements established to ensure that a network operates at or above a minimum level of service (e.g., for customers).

At 510, the network management service 102 is configured to use the generated state dependency graph and the defined policies to manage the network. For example, the generated state dependency graph is used to ensure that state conflicts between proposed network states are avoided and the defined polices are used to ensure that the network performance does not fall below a minimum level of service.

The example process 500 may be implemented as part of an on-going network management and maintenance task. Thus, state variables, dependencies and/or policies may continue to be defined and updated over a period of time, and in return, the state dependency graph may be updated as well. The example process 500 may also be implemented part of an initial establishment of a network (e.g., the building of an administrative network to perform a service).

Figure 6:
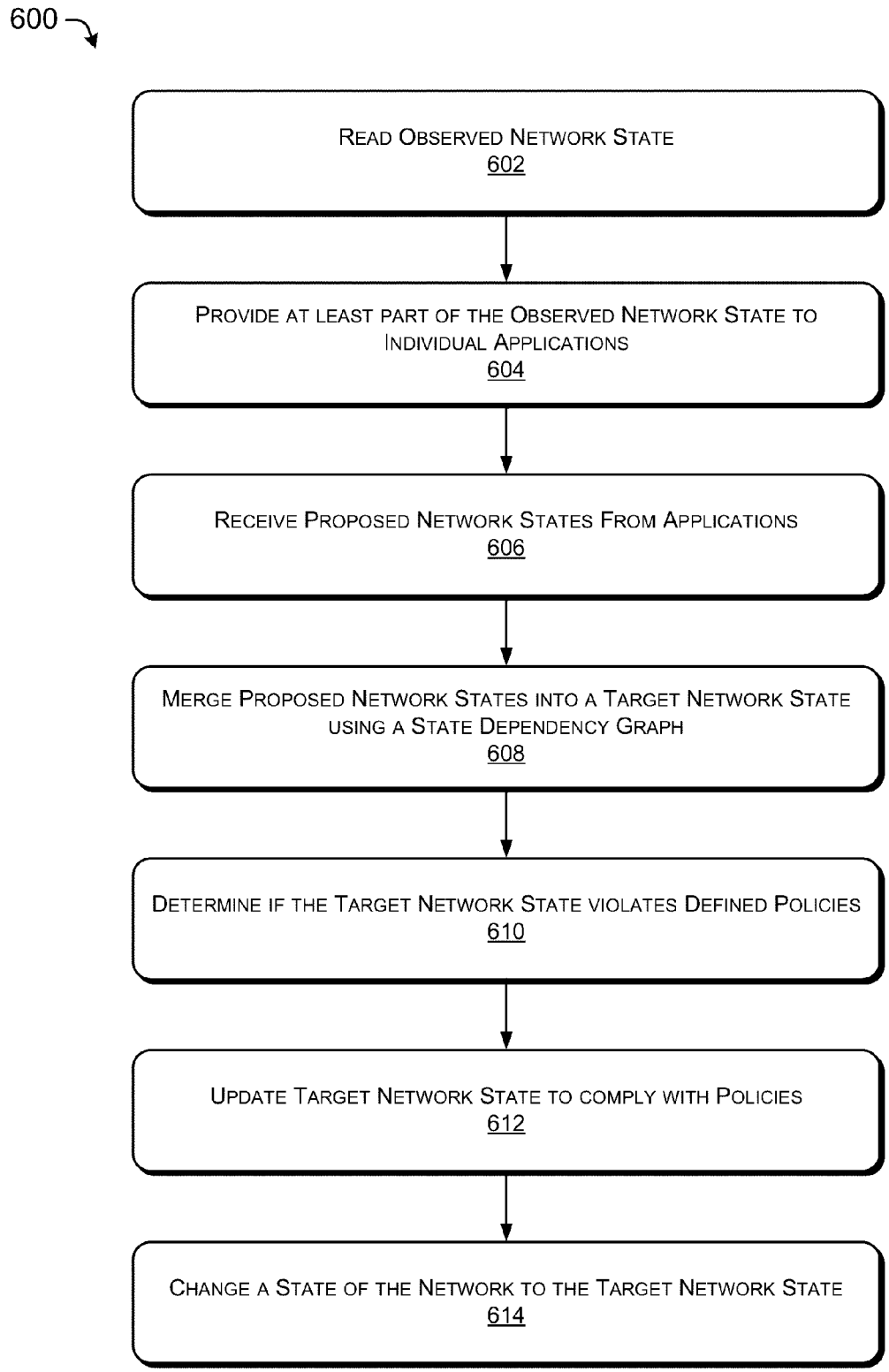
FIG. 6 illustrates an example process that updates an observed network state or a current network state based on the merging of proposed network states into a target network state, in accordance with various embodiments.

FIG. 6 illustrates an example process 600 that updates a current network state based on the merging of proposed network states into a target network state. The example operations in FIG. 6 may be described with reference to the modules, components, elements and/or operations illustrated in any one of FIGS. 1-5.

At 602, the monitoring module 308 reads the observed network state 110. As discussed above, the monitoring module 308 may read current values for various state variables that comprise the network state and then store the read values in the state variables store 314 (e.g., as key-value pairs).

At 604, the monitoring module 308 provides at least part of the observed network state 110 to individual applications (e.g., applications 112(1) . . . 112(N)). For example, the monitoring module 308 may provide, via a push technique, one or more state variable values to a particular application, the state variable values provided to the particular application being relevant to a network function and/or network aspect being managed and controlled by the particular application. In another example, the monitoring module 308 may provide one or more state variable values to a particular application in response to receiving a request for the one or more state variable values (e.g., a pull request).

At 606, the checking module 310 receives proposed network states from the applications. An individual proposed network state suggests a change to the observed network state 110, the change indicating that a state variable be changed from the observed value to a desired value. As discussed above, the observed value to be changed may be the observed value communicated to the particular application or may be an updated observed value read and stored by the monitoring module 308 in an event the value was updated or changed in between the provision of the observed value to the particular application and the reception of the proposed network state from the particular application.

At 608, the checking module 310 merges a subset of the proposed network states received into a target network state using a state dependency graph. Thus, the proposed network states merged into the target network state are free of state conflicts and therefore are non-conflicting proposed network states. If the checking module 310 detects a conflict between two or more proposed network state, the checking module may select and accept one proposed network state and reject the others. In various embodiments, the selection may be made based on a last-write win mechanism, a locking mechanism or a priority-based mechanism.

In various implementations, the checking module 310 may determine whether a state variable can be written to and/or whether conflicts exist based on a state dependency graph structured according to a multi-layer hierarchy. Using the multi-layer hierarchy, the checking module 310 can be more efficient in merging proposed network states. For example, a top layer of the multi-layered state dependency graph may include power state variables of a device 106. If a power state variable has a value indicating power is shut off, then other state variables in layers lower than the power state variable layer may be invalid or null because there is no power. Thus, any proposed network states associated with these lower layers may be rejected if the power is shut off. If power is properly provided to the device 106 (e.g., the power state variable has a value indicating power is turned on), the network management service 102 can then move to the next layer in the multi-layer hierarchy and control device firmware state variables so that the device executes particular firmware. Continuing this example, a device firmware state variable may be a prerequisite for managing device configuration state variables that are part of a next layer in the multi-layer hierarchy. Once a device-configuration state is set to a particular value, the network management service 102 can manage routing control state variable. Therefore, the checking module 310 may accept and/or reject proposed network states based on an understanding of dependencies established for a multi-layered state dependency graph.

At 610, the checking module 310 determines if the target network state violates defined policies. In various embodiments, the checking module 310 may perform this determination each time a proposed network state is added to, or merged with, the target network state comprising non-conflicting proposed network states that have already been merged (e.g., a target network state not yet completed and ready to be written to the network by the updating module 312). In various embodiments, the checking module 310 may perform this determination after the target network state is completed and ready to be written to the network by the updating module 312.

At 612, in various embodiments, the checking module 310 may update the target network state so that it complies with the defined policies. For example, if a violation is determined at operation 610, the checking module 310 may remove one or more non-conflicting proposed network states from the target network state to address the violation and to ensure that the target network state complies with the defined policies.

At 614, the updating module 312 changes a state of the network to the target network state (e.g., convert the observed network state communicated to the applications to the target network state, convert an updated or more recent observed network state to the target network state). For example, the updating module 312 may determine differences between the current network state and the target network state, generate commands based on the differences, and then issue the commands (e.g., write the changes) to the devices 106 of the network so that state variables can be changed from current values observed by the network management service to values desired by the applications.

Figure 7:
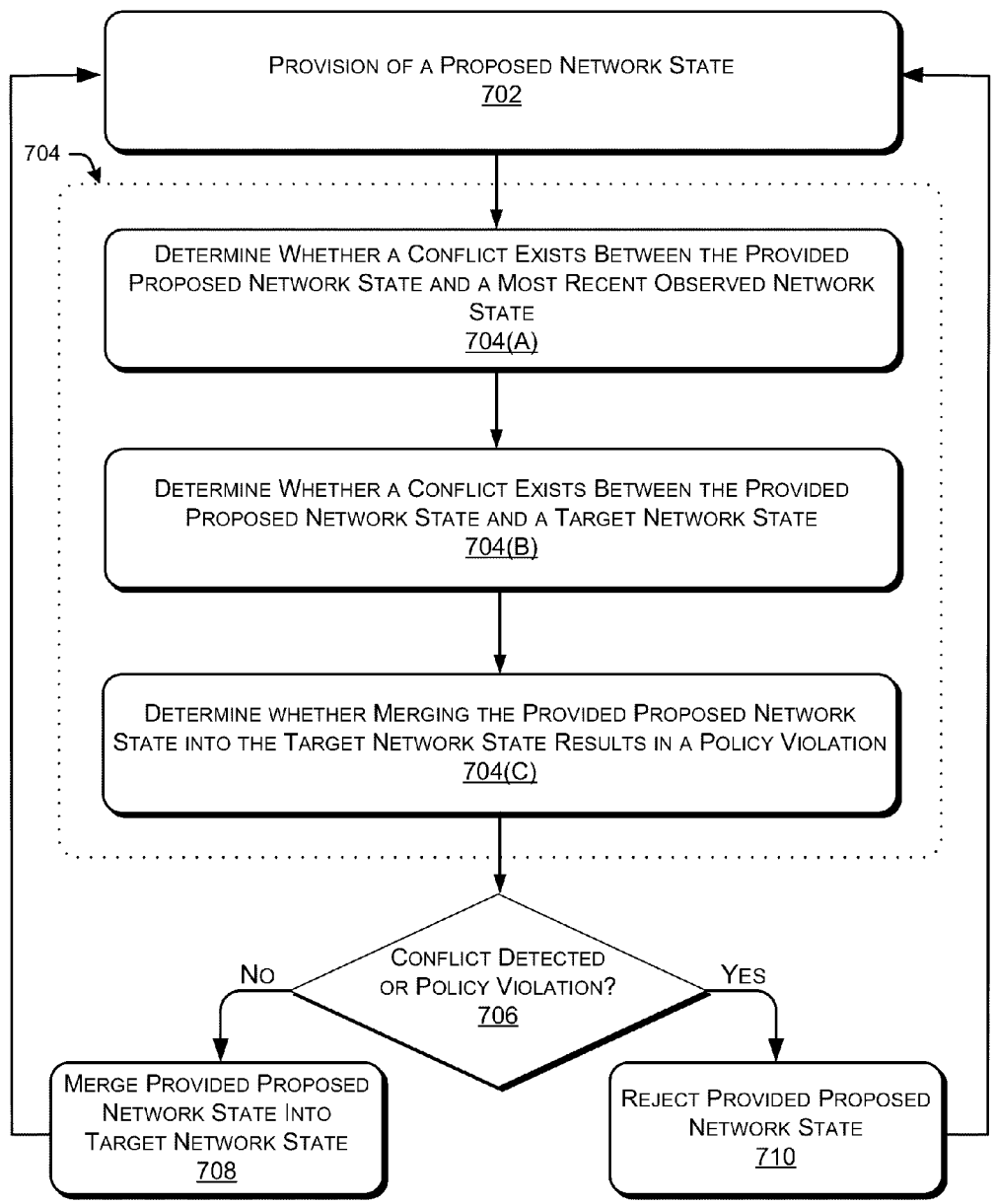
FIG. 7 illustrates an example process that continues to generate and update the target network state, in accordance with various embodiments.

FIG. 7 illustrates an example process 700 that continues to generate and update the target network state. The example operations in FIG. 7 may be described with reference to the modules, components, elements and/or operations illustrated in any one of FIGS. 1-6.

At 702, the checking module 310 is provided a proposed network state. The provided proposed network state may be one of the proposed network states received from various applications in response to the reading, storage and provision of a recent observed network state.

One or more of the individual operations within 704 are then performed to determine whether the provided proposed network state is to be merged into a target network state. The individual operations in 704 may be performed by accessing the state dependency graph and/or the defined policies. At 704(A), the checking module 310 determines whether a state conflict exists between the provided proposed network state and a most recent observed network state. In some instances, the most recent observed network state may be the observed network state provided to the applications. In some instances, the most recent observed network state may be different than the observed network state provided to the applications. Therefore, some state variable and/or state variable values may no longer be meaningful.

For example, the monitoring module 308 may have initially read that a device was powered on and communicated such to an application. In response, the application may submit a proposed network state that suggests a change to a value for a firmware version state variable. However, power to the device that used to be powered on may have been shut off so the device can be repaired, for example. Consequently, the observed network state has changed by the time the proposed network state that suggests the change to the value for the firmware version state variable is received and processed by the checking module 310. Due to the power being shut off and the firmware version state variable depending on a power state variable, the firmware version state variable is a temporarily uncontrollable state variable. (e.g., until power to the device is turned back on). In this example, the propose network state is rejected by the checking module 310.

At 704(B), the checking module 310 determines whether a state conflict exists between the provided proposed network state and a target network state. The target network state may include non-conflicting proposed network states that have been previously accepted by the checking module 310 and merged into the target network state before a final target network state is ready to be written to the network by the updating module 310. Thus, the checking module 310 may run a check between the provided proposed network state and each non-conflicting proposed network state already merged into the target network state to detect a state conflict.

At 704(C), the checking module 310 determines whether merging the provided the proposed network state into the target network state results in a policy violation.

At decision block 706, the checking module 310 determines whether a conflict from operation 704(A) or operation 704(B) is detected or if a policy violation from operation 704(C) is detected. If the answer to decision block 706 is "No", then at 708 the checking module 310 accepts the provided proposed network state and merges the provided proposed network state into the target network state. The iterative process then returns to operation 702 where the checking module 310 is provided a next proposed network state.

If the answer to decision block 706 is "Yes", then at 710 the checking module 310 rejects the provided proposed network state and does not merge the provided proposed network state into the target network state so that state conflicts are avoided and/or so that the target network state complies with defined policies. The iterative process then returns to operation 702 where the checking module 310 is provided a next proposed network state.

In various embodiments, instead of rejecting the provided proposed network state at operation 710, the checking module 310 may remove, from the target network state, a conflicting proposed network state that has already been merged into the target network state. Then the checking module 310 may be able to accept the provided proposed network state and merge the provided proposed network state into the target network state even after a conflict is detected. This may occur when the provided proposed network state has priority over a conflicting proposed network state that has already been merged into the target network state.

CONCLUSION

Although the present disclosure may use language that is specific to structural features and/or methodological acts, the invention is not limited to the specific features or acts described herein. Rather, the specific features and acts are disclosed as illustrative forms of implementing the invention.

What is claimed is:

1. A method comprising:
providing one or more state variable values of an observed network state to individual applications that independently manage at least part of a network;
receiving a plurality of proposed network states from a plurality of applications, wherein an individual proposed network state of the plurality of proposed network states proposes one or more changes to the one or more state variable values;
merging at least a subset of the plurality of proposed network states into a target network state, wherein no individual one of the subset of the plurality of proposed networks states conflicts with another individual one of the subset of the plurality of proposed networks states;
determining, by one or more hardware processors, differences between the observed network state and the target network state;
generating, based at least in part on the differences between the observed network state and the target network state, one or more device-specific commands to write to one or more devices of the network; and
writing the one or more device-specific commands to the one or more devices to change a state of the network from the observed network state to the target network state.

2. The method of claim 1, further comprising:
determining that the target network state violates a defined policy established for the network; and
in response to determining that the target network state violates the defined policy established for the network, updating the target network state by removing at least one of the plurality of proposed network states so that the updated target network state complies with the defined policy established for the network.

3. The method of claim 2, wherein the defined policy comprises a service level agreement.

4. The method of claim 1, further comprising:
determining that a state conflict exists between at least two proposed network states;
selecting one proposed network state of the at least two proposed network states to accept and to merge into the target network state; and
rejecting at least one other proposed network state of the at least two proposed network states such that the at least one other proposed network state is not merged into the target network state.

5. The method of claim 4, wherein the selecting is based at least in part on one of a last-write-win selection mechanism, a locking selection mechanism, or a priority-based selection mechanism.

6. The method of claim 1, further comprising maintaining a state dependency graph that defines that a first state variable depends on a second state variable.

7. The method of claim 6, wherein a state variable is a component of the network controllable by at least one application.

8. The method of claim 1, wherein the one or more state variable values represent a state of a device of the network, the method further comprising:
- reading the one or more state variable values from the device using a device-specific technique; and
- storing the one or more state variable values in a unified format that is understood by the plurality of applications.

9. One or more devices comprising:
- one or more processors;
- memory storing executable instructions that, when executed by the one or more processors, cause the one or more devices to:
  - read an observed network state from a network;
  - provide the observed network state to a plurality of applications that independently manage at least a part of the network;
  - receive at least two proposed network states from at least two applications of the plurality of applications, wherein an individual proposed network state of the at least two proposed network states requests that a value of a state variable of the network be changed to a proposed value;
  - determine that a conflict exists between the at least two proposed network states;
  - select at least one proposed network state of the at least two proposed network states to accept and to merge into a target network state;
  - reject at least one other proposed network state of the at least two proposed network states such that the at least one other proposed network state is not merged into the target network state; and
  - change a state of the network based at least in part on the target network state.

10. The one or more devices of claim 9, wherein the executable instructions further cause the one or more devices to:
- access a state dependency graph that defines dependencies between state variables of the network; and
- detect the conflict using the state dependency graph.

11. The one or more devices of claim 10, wherein:
- the at least one proposed network state that is merged into the target network state requests that a value of a first state variable of the network be changed to a first proposed value;
- the at least one proposed network state that is not merged into the target network state requests that a value of a second state variable of the network be changed to a second proposed value; and
- the state dependency graph defines that the first proposed value is incompatible with the second proposed value.

12. The one or more devices of claim 10, wherein the state dependency graph is a multi-layer state dependency graph where each layer comprises state variables of a particular type, and one or more of the dependencies occur between layers in the multi-layer state dependency graph.

13. The one or more devices of claim 9, wherein the executable instructions further cause the one or more devices to:
- determine that the target network state violates a defined policy established for the network; and
- in response to determining that the target network state violates the defined policy established for the network, removing the at least one proposed network state from the target network state so that the target network state complies with the defined policy established for the network.

14. The one or more devices of claim 9, wherein the selecting is based at least in part on one of a last-write-win selection mechanism, a locking selection mechanism, or a priority-based selection mechanism.

15. The one or more devices of claim 9, wherein the executable instructions further cause the one or more devices to:
- determine differences between the observed network state and the target network state;
- generate, based at least in part on the differences between the observed network state and the target network state, one or more device-specific commands to write to one or more network devices; and
- write the one or more device-specific commands to the one or more network devices to change the state of the network from the observed network state to the target network state.

16. The one or more devices of claim 9, wherein the executable instructions further cause the one or more devices to:
- read an updated observed network state, the updated observed network state being read more recently than the observed network state provided to the individual applications;
- determine differences between the updated observed network state and the target network state;
- generate, based at least in part on the differences between the updated observed network state and the target network state, one or more device-specific commands to write to one or more network devices; and
- write the one or more device-specific commands to the one or more network devices to change the state of the network from the updated observed network state to the target network state.

17. The one or more devices of claim 9, wherein the executable instructions further cause the one or more devices to:
- observe one or more state variable values of a network device using a device-specific technique; and
- storing the one or more state variable values in a unified format that is understood by the plurality of applications; and
- provide, as part of the observed network state, the one or more state variable values in the unified format to the plurality of applications.

18. One or more devices, comprising:
- one or more processors;
- one or more memories;
- a monitoring module, stored on the one or more memories and executed by the one or more processors, to read an observed network state of a network and to provide at least part of the observed network state to individual applications that independently manage a part of the network;
- a checking module, stored on the one or more memories and executed by the one or more processors, to generate a target network state by:
  - determining whether one or more state variable conflicts exist between proposed network states received from a plurality of applications; and
  - merging non-conflicting proposed network states into the target network state, wherein an individual proposed network state proposes one or more changes to one or more values of one or more state variables defined for the network; and
- an updating module, stored on the one or more memories and executed by the one or more processors, to:

determine differences between the observed network state and the target network state;

generate, based at least in part on the differences between the observed network state and the target network state, one or more device-specific commands to write to one or more network devices; and write the one or more device-specific commands to the one or more network devices to convert the observed network state to the target network state.

19. The one or more devices of claim 18, wherein the checking module accesses a state dependency graph to determine whether the one or more state variable conflicts exist between the proposed network states.

20. The one or more devices of claim 18, wherein the checking module determines whether the target network state violates one or more defined policies for the network and, in response to determining that the target network state violates at least one defined policy of the one or more defined policies, the checking module removes at least one proposed network state from the target network state so that the target network state complies with the one or more defined policies.

* * * * *